(12) United States Patent
Van der Auwera et al.

(10) Patent No.: US 9,185,404 B2
(45) Date of Patent: Nov. 10, 2015

(54) PERFORMING TRANSFORM DEPENDENT DE-BLOCKING FILTERING

(71) Applicant: Qualcomm Incorporated, San Diego, CA (US)

(72) Inventors: Geert Van der Auwera, San Diego, CA (US); Rajan Laxman Joshi, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 361 days.

(21) Appl. No.: 13/645,345

(22) Filed: Oct. 4, 2012

(65) Prior Publication Data

US 2013/0094572 A1 Apr. 18, 2013

Related U.S. Application Data

(60) Provisional application No. 61/544,960, filed on Oct. 7, 2011, provisional application No. 61/554,260, filed on Nov. 1, 2011, provisional application No. 61/588,480, filed on Jan. 19, 2012, provisional (Continued)

(51) Int. Cl.
*H04N 19/96* (2014.01)
*H04N 19/126* (2014.01)
(Continued)

(52) U.S. Cl.
CPC ....... *H04N 19/00096* (2013.01); *H04N 19/126* (2014.11); *H04N 19/70* (2014.11); *H04N 19/86* (2014.11)

(58) Field of Classification Search
CPC ..... H04N 19/86; H04N 19/117; H04N 19/91; H04N 19/61; H04N 19/00066; H04N 19/00096; H04N 19/00684; H04N 19/00733; H04N 19/00775; H04N 19/00951; H04N 19/154; H04N 19/176; H04N 19/436
USPC ........................................ 375/240.16, 240.29
See application file for complete search history.

(56) References Cited

U.S. PATENT DOCUMENTS 8,422,550 B2 * 4/2013 Li ............................. 375/240.01
2005/0046702 A1 * 3/2005 Katayama et al. ......... 348/222.1

(Continued)

OTHER PUBLICATIONS

International Preliminary Report on Patentability from International Application No. PCT/US2012/059010, dated Feb. 12, 2014, 13 pp.

(Continued)

*Primary Examiner* — Geepy Pe
*Assistant Examiner* — Salame Amr
(74) *Attorney, Agent, or Firm* — Shumaker & Sieffert, P.A.

(57) ABSTRACT

In general, techniques are described for performing transform dependent de-blocking filtering, which may be implemented by a video encoding device. The video encoding device may apply a transform to a video data block to generate a block of transform coefficients, apply a quantization parameter to quantize the transform coefficients and reconstruct the block of video data from the quantized transform coefficients. The video encoding device may further determine at least one offset used in controlling de-blocking filtering based on the size of the applied transform, and perform de-blocking filtering on the reconstructed block of video data based on the determined offset. Additionally, the video encoder may specify a flag in a picture parameter set (PPS) that indicates whether the offset is specified in one or both of the PPS and a header of an independently decodable unit.

63 Claims, 8 Drawing Sheets

Related U.S. Application Data application No. 61/663,469, filed on Jun. 22, 2012, provisional application No. 61/682,167, filed on Aug. 10, 2012, provisional application No. 61/700,167, filed on Sep. 12, 2012.

(51) Int. Cl.
   *H04N 19/70* (2014.01)
   *H04N 19/86* (2014.01)

(56) References Cited

U.S. PATENT DOCUMENTS

| | | | |
|---|---|---|---|
| 2005/0206785 A1* | 9/2005 | Swan et al. | 348/448 |
| 2008/0199090 A1 | 8/2008 | Tasaka et al. | |
| 2009/0002379 A1* | 1/2009 | Baeza et al. | 345/522 |
| 2009/0003446 A1* | 1/2009 | Wu et al. | 375/240.16 |
| 2009/0034446 A1 | 2/2009 | Adams et al. | |
| 2009/0304085 A1 | 12/2009 | Avadhanam et al. | |
| 2011/0080957 A1 | 4/2011 | Pan et al. | |
| 2011/0090967 A1 | 4/2011 | Chen et al. | |
| 2011/0170610 A1 | 7/2011 | Min et al. | |

OTHER PUBLICATIONS

Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.

Osamoto et al: "List of items requiring clarification/action in HM1", 95. MPEG Meeting; Jan. 20-28, 2011; Daegu; (Motion Picture Expert Group or ISO/IEC JTC1/SC29/WG11), No. m18766, XP030047336, 5 pp.

Response to Written Opinion dated Apr. 4, 2013, from International Application No. PCT/US2012/059010, filed Aug. 6, 2013, 99 pp.

Second Written Opinion from International Application No. PCT/US2021/059010 dated Sep. 9, 2013, 7 pp.

Response to Second Written Opinion dated Sep. 9, 2013, from International Application No. PCT/US2012/059010, filed Nov. 6, 2013, 7 pp.

Invitation to Pay Additional Fees dated Dec. 4, 2013, from International Application No. PCT/US2012/059010, filed Nov. 6, 2013, 3 pp.

Bross et al., "WD4: Working Draft 4 of High-Efficiency Video Coding", 6. JCT-VC Meeting; 97. MPEG Meeting; Jul. 14, 2011-Jul. 22, 2011; Torino; (Joint Collaborative Team on Video Coding of ISO/IEC JTC1/SC29/WG11 and ITU-T SG.16) ; URL: http://wftp3.itu.int/av-arch/jctvc-site/, No. JCTVC-F803, Sep. 8, 2011, XP030009800.

Bross et al., "High efficiency video coding (HEVC) text specification draft 6," Joint Collaborative Team on Video Coding (JCT-VC) of ITU-T SG16 WP3 and ISO/IEC JTC1/SC29/WG11 JCTVC-H1003, 7th Meeting: Geneva, CH, Nov. 21-30, 2011, 259 pp.

Bross et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27-May 7, 2012, JCTVC-I1003_d21, 290 pp.

Bross et al., "High efficiency video coding (HEVC) text specification draft 8," Joint Collaborative Team on Video Coding (JCT-VC) of ITU-T SG16 WP3 and ISO/IEC JTC1/SC29/WG11 10th Meeting: Stockholm, SE, Jul. 11-20, 2012, JCTVC-J1003_d7, 261 pp.

Bross et al., "WD4: Working Draft 4 of High-Efficiency Video Coding," JCTVC-F803, ISO/IEC/ITU-T Joint Collaborative Team on Video Coding, Turin, Italy (Jul. 2011).

Bross et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pp.

Bross et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pp.

Cao et al., "CE6.b Report on test7 Harmonization of SDIP and deblocking filter", 6. JCT-VC Meeting; 97. MPEG Meeting; Jul. 14, 2011-Jul. 22, 2011; Torino; (Joint Collaborative Team on Video Coding of ISO/IEC JTC1/SC29/WG11 and ITU-T SG. 16 ) ; URL: http://wftp3.itu.int/av-arch/jctvc-site/ No. JCTVC-F536, Jul. 1, 2011, XP030009559.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Partial International Search Report—PCT/US2012/059010—ISA/EPO—Dec. 20, 2012

Shi et al., "CE12, Subset 1: Report of Deblocking for Large Size Blocks", 6. JCT-VC Meeting; 97. MPEG Meeting; Jul. 14, 2011-Jul. 22, 2011; Torino; (Joint Collaborative Team on Video Coding of ISO/IEC JTC1/SC291/WG11 and ITU-T SG. 16 ); URL: http://wftp3.itu.int/av-arch/jctvc-site/., No. JCTVC-F198, Jul. 12, 2011, XP030009221.

Van der Auwera et al., "Non-CE12 Subtest 5: Transform Dependent Deblocking Filter Parameter Adjustment in Slice Level", 7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG. 16 ) ; URL: http://wftp3.1tu.int/av-arch/jctvc-site/, No. JCTVC-G291, Nov. 9, 2011, XP030110275.

Wiegand et al., "WD2: Working Draft 2 of High-Efficiency Video Coding", 20110128, No. JCTVC-D503, Jan. 28, 2011, XP002679642, Retrieved from the Internet: URL: http://wftp3.itu.int/av-arch/jctvc-site/2011_01_D_Daegu/ [retrieved on Jul. 11, 2012].

Wiegand et al., "WD3: Working Draft 3 of High-Efficiency Video Coding," Document JCTVC-E603, 5th Meeting: Geneva, CH, Mar. 16-23, 2011, 193 pp.

Wiegand et al.,"WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010.

Yamakage et al., "Analysis on the interaction between deblocking filtering and in-loop filtering" , 4. JCT-VC Meeting; 95. MPEG Meeting; Jan. 20, 2011-Jan. 28, 2011; Daegu;(Joint Collaborative Team on Video Coding of ISO/ IEC JTC1/SC29/WG11 and ITU-T SG. 16 ) ; URL: http://wftp3.itu.int/av-arch/jctvc-site/-15/01/2011, No. JCTVC-D192, Jan. 15, 2011, XP030008232, ISSN: 0000-0014.

Yamkage et al. "CE12: Deblocking Filter Parameter Adjustment in Slice Level," 6th JCT-VC Meeting, Turin, Italy, Jul. 2011, Doc. JCTVC-F143.

Yamakage et al., "Description of Core Experiment 8: In-loop filtering", 94. MPEG Meeting; Oct. 11, 2010-Oct. 15. 2010; Guangzhou; (Motion Picture Expert Group or ISO/IEC JTC1/SC29/WG11) No. M18612, Oct. 28, 2010, XP030047202.

Kwon, et al., "Transform size dependent deblocking filter," Joint Collaborative Team on Video Coding (JCT-VC) of ITU-T SG 16 WP 3 and ISO/IEC JTC 1/SC 29/WG 11 9th Meeting: Geneva, CH, Apr. 27-May 7, 2012, Document: JCTVC-I0244, 12 pp.

International Search Report and Written Opinion—PCT/US2012/059010—ISA/EPO—Apr. 4, 2013 24 pp.

Norkin, "BoG report on resolving deblocking filter description issues" JCTVC-G1035_r1, Joint Collaborative Team on Video Coding (JCT-VC) of ITU-T SG16 WP3 and ISO/IEC JTC1/SC29/WG11, 7th Meeting: Geneva, Nov. 21-30, 2011, WG11 No. m22824, 22 pp.

Wenger et al., "Adaptation Parameter Set (APS)," Document: JCTVC-F747r3, Joint Collaborative Team on Video Coding (JCT-VC) of ITU-T SG16 WP3 and ISO/IEC JTC1/SC29/WG11, 6th Meeting: Torino, IT, Jul. 14-22, 2011, 10 pp.

List, "AHG Report: Loop Filter", 2. JVT Meeting; Jan. 29, 2002-Feb. 1, 2002; Geneva; CH; (Joint Video Teamof ISO/IEC JTC1/SC29/WG11 and ITU-T SG.16), No. JVT-B011r2, Feb. 1, 2002, XP030005010, ISSN: 0000-0443, 5 pp.

Van der Auwera et al., "Non-CE1: Deblocking of Large Block Artifacts", 11. JCT-VC Meeting; 102. MPEG Meeting; Oct. 10, 2012-Oct. 19, 2012; Shanghai; (Joint Collaborative Team on Video Coding

(56) References Cited

OTHER PUBLICATIONS of ISO/IEC JTC1/SC29/WG11 and ITU-T SG.16); URL: http://wftp3.itu.int/av-arch/jctvc-site/ No. JCTVC-K0138, Oct. 2, 2012, XP030113020, 23 pp.

Van der Auwera et al., "AHG6: Transform Dependent Deblocking Strength", 10. JCT-VC Meeting; 101. MPEG Meeting; Jul. 11, 2012-Jul. 20, 2012; Stockholm; (Joint Collaborative Team on Video Coding of ISO/IEC JTC1/SC29/WG11 and ITU-T SG.16); URL: http://wftp3.itu.int/av-arch/jctvc-site/ No. JCTVC-J0090, Jul. 3, 2012, XP030112452, 14 pp.

Taiwan Search Report from Taiwanese Application No. 101137019, dated Jun. 29, 2015, 1 page.

Yamakage T., et al., "Description of CE8: In-loop filtering", JCT-VC of of ITU-T SG16 WP3 and ISO/IEC JTC1/SC29/WG11 3rd Meeting, Guangzhou, JCTVC-C508_r1, Oct. 7-15, 2010, pp. 1-14.

* cited by examiner

PERFORMING TRANSFORM DEPENDENT DE-BLOCKING FILTERING

This application claims the benefit of U.S. Provisional Application No. 61/544,960, filed Oct. 7, 2011, U.S. Provisional Application No. 61/554,260, filed Nov. 1, 2011, U.S. Provisional Application No. 61/588,480, filed Jan. 19, 2012, U.S. Provisional Application No. 61/663,469, filed Jun. 22, 2012, U.S. Provisional Application No. 61/682,167, filed Aug. 10, 2012, and U.S. Provisional Application No. 61/700,167, filed Sep. 12, 2012, the entire contents of all of which are each incorporated herein by reference.

TECHNICAL FIELD

This disclosure relates to video coding, and more particularly, to de-blocking video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

SUMMARY

In general, this disclosure describes techniques for performing de-blocking of edges between video blocks based on a size of a transform used to transform residual video data of video blocks from the spatial domain to a frequency domain. For example, the techniques may enable a video encoder and/or a video decoder to select various offsets used in performing de-blocking based on the size of the transform used to transform these residual video data blocks. Moreover, the techniques may enable a video encoder and/or a video decoder to select various offsets used in performing de-blocking based not only on the size of the transform but also on whether the current video block was intra-coded or inter-coded. The techniques of this disclosure may improve perceived visual quality of the resulting video data after encoding, subsequent decoding and display. The techniques may also promote coding gains in terms of the size of resulting encoded video data in comparison to encoded video data generated using conventional techniques.

In one aspect, a method of encoding video data comprises applying a transform to a block of the video data to generate a block of transform coefficients and applying a quantization parameter to quantize the block of transform coefficients. The method further comprises reconstructing the block of video data from the quantized block of transform coefficients determining at least one offset used in determining whether to perform de-blocking filtering of the reconstructed block of video data or used in determining de-blocking filtering strength based on the size of the applied transform and performing de-blocking filtering on the reconstructed block of video data based on the determined at least one offset.

In another aspect, a video encoding device configured to encode video data comprises one or more processors configured to apply a transform to a block of the video data to generate a block of transform coefficients, apply a quantization parameter to quantize the block of transform coefficients, reconstruct the block of video data from the quantized block of transform coefficients, determine at least one offset used in determining whether to perform de-blocking filtering of the reconstructed block of video data or used in determining de-blocking filtering strength based on the size of the applied transform and perform de-blocking filtering on the reconstructed block of video data based on the determined at least one offset.

In another aspect, a video encoding device configured to encode video data comprises means for applying a transform to a block of the video data to generate a block of transform coefficients and means for applying a quantization parameter to quantize the block of transform coefficients. The video encoding device further comprises means for reconstructing the block of video data from the quantized block of transform coefficients, means for determining at least one offset used in determining whether to perform de-blocking filtering of the reconstructed block of video data or used in determining de-blocking filtering strength based on the size of the applied transform and means for performing de-blocking filtering on the reconstructed block of video data based on the determined at least one offset.

In another aspect, a non-transitory computer-readable storage medium having stored thereon instructions that, when executed, cause one or more processors to apply a transform to a block of the video data to generate a block of transform coefficients, apply a quantization parameter to quantize the block of transform coefficients, reconstruct the block of video data from the quantized block of transform coefficients, determine at least one offset used in determining whether to perform de-blocking filtering of the reconstructed block of video data or used in determining de-blocking filtering strength based on the size of the applied transform and perform de-blocking filtering on the reconstructed block of video data based on the determined at least one offset.

In another aspect, a method of decoding encoded video data with a video decoder comprises applying an inverse quantization parameter to a block of the encoded video data to de-quantize the block of the encoded video data and applying the inverse transform to the de-quantized block of the encoded video data to generate a block of residual video data. The method further comprises reconstructing a block of video data from the block of residual video data and determining at least one offset used in determining whether to perform de-blocking filtering of the reconstructed block of video data or used in determining de-blocking filtering strength. The at least one offset is associated with a size of a transform applied to encode the block of the encoded video data. The method also comprises performing de-blocking filtering on the reconstructed block of video data based on the determined at least one offset.

In another aspect, a video decoding device configured to decoding encoded video data comprises one or more processors configured to apply an inverse quantization parameter to a block of the encoded video data to de-quantize the block of the encoded video data, apply the inverse transform to the de-quantized block of the encoded video data to generate a block of residual video data, reconstruct a block of video data from the block of residual video data and determine at least one offset used in determining whether to perform de-blocking filtering of the reconstructed block of video data or used in determining de-blocking filtering strength. The at least one offset is associated with a size of a transform applied to encode the block of the encoded video data. The one or more processors are further configured to perform de-blocking filtering on the reconstructed block of video data based on the determined at least one offset.

In another aspect, a video decoding device for decoding encoded video data comprises means for applying an inverse quantization parameter to a block of the encoded video data to de-quantize the block of the encoded video data and means for applying the inverse transform to the de-quantized block of the encoded video data to generate a block of residual video data. The video decoding device further comprises means for reconstructing a block of video data from the block of residual video data and means for determining at least one offset used in determining whether to perform de-blocking filtering of the reconstructed block of video data or used in determining de-blocking filtering strength. The at least one offset is associated with a size of a transform applied to encode the block of the encoded video data. The video decoding device further comprises means for performing de-blocking filtering on the reconstructed block of video data based on the determined at least one offset.

In another aspect, a non-transitory computer-readable medium having stored thereon instruction that, when executed, cause one or more processors to apply an inverse quantization parameter to a block of the encoded video data to de-quantize the block of the encoded video data, apply the inverse transform to the de-quantized block of the encoded video data to generate a block of residual video data, reconstruct a block of video data from the block of residual video data, determine at least one offset used in determining whether to perform de-blocking filtering of the reconstructed block of video data or used in determining de-blocking filtering strength, wherein the at least one offset is associated with a size of a transform applied to encode the block of the encoded video data, and perform de-blocking filtering on the reconstructed block of video data based on the determined at least one offset.

In another aspect, a method of coding video data comprises determining one or more deblocking filter clipping thresholds based on a boundary strength value, performing a clipping operation with respect to a deblocking filter using the determined one or more deblocking filter clipping thresholds to determine a clipped deblocking filter and applying the clipped de-blocking filter to a block of the video data.

In another aspect, a video coding device for coding video data comprises one or more processors configured to determine one or more deblocking filter clipping thresholds based on a boundary strength value, perform a clipping operation with respect to a deblocking filter using the determined one or more deblocking filter clipping thresholds to determine a clipped deblocking filter and apply the clipped de-blocking filter to a block of the video data.

In another aspect, a video coding device for coding video data, the video coding device comprises means for determining one or more deblocking filter clipping thresholds based on a boundary strength value, means for performing a clipping operation with respect to a deblocking filter using the determined one or more deblocking filter clipping thresholds to determine a clipped deblocking filter and means for applying the clipped de-blocking filter to a block of the video data.

In another aspect, a non-transitory computer-readable storage medium having stored thereon instructions that, when executed, cause one or more processors of a video coding device to determine one or more deblocking filter clipping thresholds based on a boundary strength value, perform a clipping operation with respect to a deblocking filter using the determined one or more deblocking filter clipping thresholds to determine a clipped deblocking filter and apply the clipped de-blocking filter to a block of the video data.

The details of one or more examples are set forth in the accompanying drawings and the description below. Other features, objects, and advantages will be apparent from the description and drawings, and from the claims.

DETAILED DESCRIPTION

Figure 1:
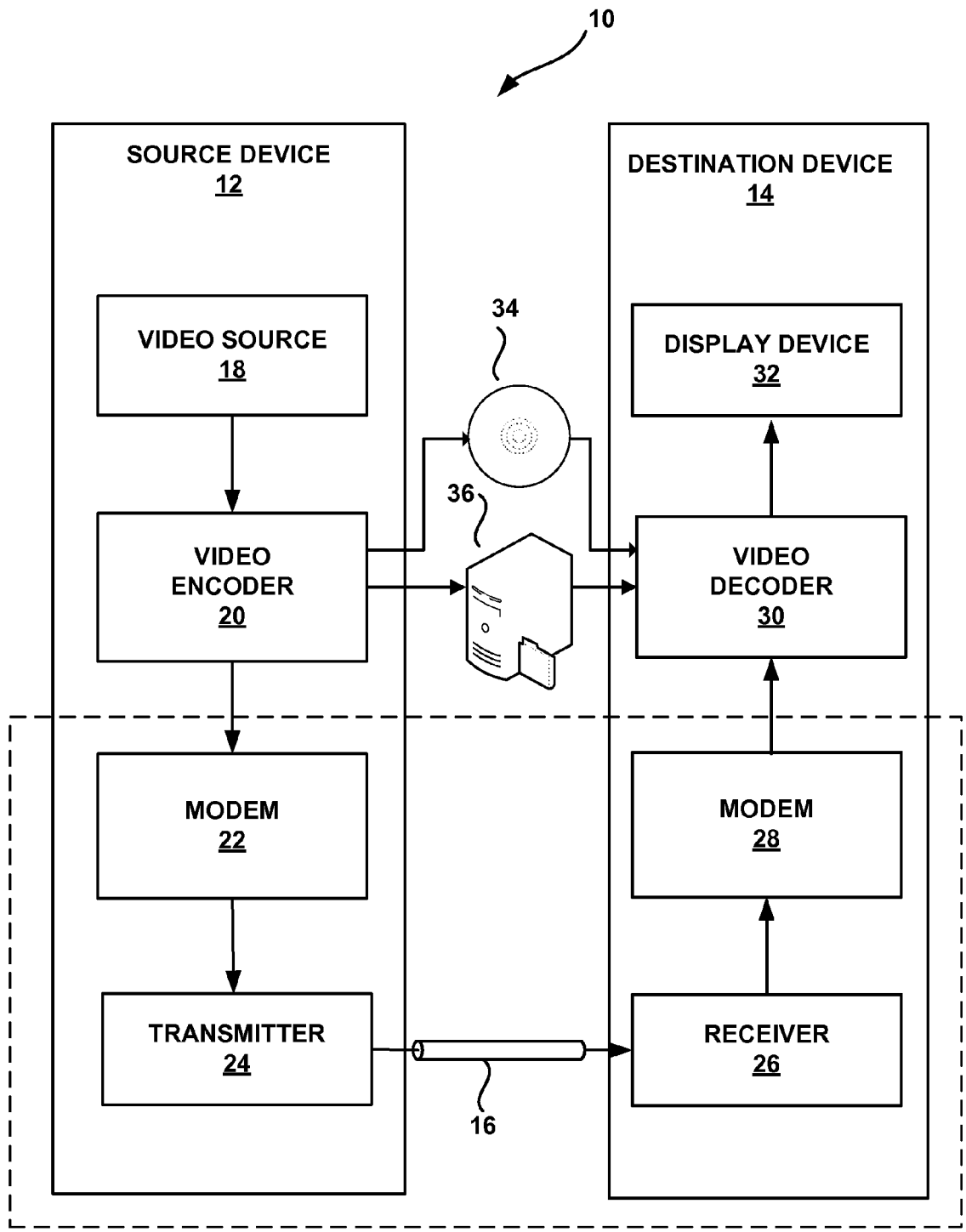
FIG. 1 is a block diagram illustrating an example video encoding and decoding system that performs various aspects of the techniques described in this disclosure.

FIG. 1 is a block diagram illustrating an example video encoding and decoding system 10 that may be configured to utilize various aspects the techniques described in this disclosure to facilitate transform dependent de-blocking filtering. As shown in FIG. 1, the system 10 includes a source device 12 that transmits encoded video to a destination device 14 via a communication channel 16. Encoded video data may also be stored on a storage medium 34 or a file server 36 and may be accessed by the destination device 14 as desired. When stored to a storage medium or file server, video encoder 20 may provide coded video data to another device, such as a network interface, a compact disc (CD), Blu-ray or digital video disc (DVD) burner or stamping facility device, or other devices, for storing the coded video data to the storage medium. Likewise, a device separate from video decoder 30, such as a network interface, CD or DVD reader, or the like, may retrieve coded video data from a storage medium and provided the retrieved data to video decoder 30.

The source device 12 and the destination device 14 may comprise any of a wide variety of devices, including desktop computers, notebook (i.e., laptop) computers, tablet computers, set-top boxes, telephone handsets such as so-called smartphones, televisions, cameras, display devices, digital media players, video gaming consoles, or the like. In many cases, such devices may be equipped for wireless communication. Hence, the communication channel 16 may comprise a wireless channel, a wired channel, or a combination of wireless and wired channels suitable for transmission of encoded video data. Similarly, the file server 36 may be accessed by the destination device 14 through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server.

Techniques for performing transform dependent de-blocking filtering, in accordance with examples of this disclosure, may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, the system 10 may be configured to support one-way or two-way video transmission to support applications such as video streaming, video playback, video broadcasting, and/or video telephony.

In the example of FIG. 1, the source device 12 includes a video source 18, a video encoder 20, a modulator/demodulator 22 and a transmitter 24. In the source device 12, the video source 18 may include a source such as a video capture device, such as a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called camera phones or video phones. However, the techniques described in this disclosure may be applicable to video coding in general, and may be applied to wireless and/or wired applications, or application in which encoded video data is stored on a local disk.

The captured, pre-captured, or computer-generated video may be encoded by the video encoder 20. The encoded video information may be modulated by the modem 22 according to a communication standard, such as a wireless communication protocol, and transmitted to the destination device 14 via the transmitter 24. The modem 22 may include various mixers, filters, amplifiers or other components designed for signal modulation. The transmitter 24 may include circuits designed for transmitting data, including amplifiers, filters, and one or more antennas.

The captured, pre-captured, or computer-generated video that is encoded by the video encoder 20 may also be stored onto a storage medium 34 or a file server 36 for later consumption. The storage medium 34 may include Blu-ray discs, DVDs, CD-ROMs, flash memory, or any other suitable digital storage media for storing encoded video. The encoded video stored on the storage medium 34 may then be accessed by the destination device 14 for decoding and playback.

The file server 36 may be any type of server capable of storing encoded video and transmitting that encoded video to the destination device 14. Example file servers include a web server (e.g., for a website), an FTP server, network attached storage (NAS) devices, a local disk drive, or any other type of device capable of storing encoded video data and transmitting it to a destination device. The transmission of encoded video data from the file server 36 may be a streaming transmission, a download transmission, or a combination of both. The file server 36 may be accessed by the destination device 14 through any standard data connection, including an Internet connection. This may include a wireless channel (e.g., a Wi-Fi connection), a wired connection (e.g., DSL, cable modem, Ethernet, USB, etc.), or a combination of both that is suitable for accessing encoded video data stored on a file server.

The destination device 14, in the example of FIG. 1, includes a receiver 26, a modem 28, a video decoder 30, and a display device 32. The receiver 26 of the destination device 14 receives information over the channel 16, and the modem 28 demodulates the information to produce a demodulated bitstream for the video decoder 30. The information communicated over the channel 16 may include a variety of syntax information generated by the video encoder 20 for use by the video decoder 30 in decoding video data. Such syntax, including the slice header syntax described above, may also be included with the encoded video data stored on the storage medium 34 or the file server 36. Each of the video encoder 20 and the video decoder 30 may form part of a respective encoder-decoder (CODEC) that is capable of encoding or decoding video data.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In the example of FIG. 1, the communication channel 16 may comprise any wireless or wired communication medium, such as a radio frequency (RF) spectrum or one or more physical transmission lines, or any combination of wireless and wired media. The communication channel 16 may form part of a packet-based network, such as a local area network, a wide-area network, or a global network such as the Internet. The communication channel 16 generally represents any suitable communication medium, or collection of different communication media, for transmitting video data from the source device 12 to the destination device 14, including any suitable combination of wired or wireless media. The communication channel 16 may include routers, switches, base stations, or any other equipment that may be useful to facilitate communication from the source device 12 to the destination device 14.

The video encoder 20 and the video decoder 30 may operate according to a video compression standard, such as the High Efficiency Video Coding (HEVC) standard presently under development, and may conform to the HEVC Test Model (HM). Alternatively, the video encoder 20 and the video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples include MPEG-2 and ITU-T H.263.

Although not shown in FIG. 1, in some aspects, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder (CODEC) in a respective device.

In some instances, video encoder 20 may implement the HM to perform video coding. The HM provides for de-blocking using de-blocking filters to remove "blockiness" artifacts. De-blocking may be performed after dividing a frame into blocks (LCUs and sub-CUs thereof), coding the blocks, and then decoding the blocks. That is, video encoder 20, when operating in accordance with the HM, may determine the blocks, perform either intra-prediction or inter-prediction (such as motion estimation and compensation) to generate residual data, apply one or more transforms, such as discrete cosine transforms (DCTs) to transform the residual data from the spatial domain to the frequency domain and output DCT coefficients representative of the residual data in the frequency domain, and quantize the DCT coefficients, where such quantization may vary based on the size of the transform applied to the residual data. Video encoder 20 may then reconstruct the encoded blocks (meaning, quantized DCT coefficients in this context) to form reconstructed blocks of video data, which are used as reference blocks when performing inter-prediction. This process of encoding the video blocks and then reconstructing these blocks may insert perceptible artifacts at edges between the neighboring blocks in a frame.

As a result, video encoder 20 may encode video data of a frame, then subsequently decode the encoded video data, and then apply de-blocking filters to the decoded video data for use as reference video data, e.g., for inter-prediction of subsequently coded video data. Video decoders, such as video decoder 30, may perform similar operations to reconstruct video data from the encoded video data and then perform de-blocking to similarly reduce the introduction of perceptible artifacts at the edges between neighboring blocks in a frame.

Such de-blocking filtering performed by a video coding device (which may refer to, in this context, video encoder 20 and/or video decoder 30) prior to storing the data for use as reference data is generally referred to as "in-loop" filtering, in that the filtering is performed within the coding loop. Video decoder 20 may be configured to decode received video data, and then apply the same de-blocking filters to the decoded video data, for purposes of displaying the video data as well as for use as reference data for subsequent video data to be encoded or decoded. By configuring both encoder 20 and decoder 30 to apply the same de-blocking techniques, encoder 20 and decoder 30 can be synchronized, such that de-blocking does not introduce error for subsequently coded video data using the deblocked video data for reference.

The HM is generally configured to determine, for each edge separating two PUs or TUs, whether to apply a de-blocking filter to deblock the edge. The HM may be configured to determine whether to deblock an edge based on an analysis of one or more lines of pixels perpendicular to the edge, e.g., a line of 8 pixels. Thus, for example, for a vertical edge, the HM may determine whether to deblock the edge by examining four pixels to the left and four pixels to the right of the edge along a common line. The number of pixels selected generally corresponds to the smallest block for de-blocking, e.g., 8×8 pixels. In this manner, the line of pixels used for analysis may enter only two PUs or TUs, namely the PUs or TUs immediately to the left and to the right of an edge. The line of pixels used for analysis of whether to perform de-blocking for an edge is also referred to as a set of support pixels, or simply "support."

Video coding devices 20, 30 may be configured to execute de-blocking decision functions relative to the support for a particular edge in accordance with a current version of the HM. In general, de-blocking decision functions are configured in the current version of the HM to detect high-frequency changes within the support. These decisions are often dependent on thresholds, such as a so-called "t, threshold" (often referred to as "$t_c$") and a "β threshold" (which is often referred to as "β"). In addition, the $t_c$ and β thresholds may also influence the strength of the de-blocking filtering. Video coding device 20, 30 may apply the $t_c$ threshold to deblock both luma and chroma samples while the video coding device applies the β threshold to perform luma sample de-blocking These thresholds are commonly determined using a parameter Q derived from a quantization parameter (QP) that defines a quantization step size and a boundary strength (BS) that defines coherence of pixel values across a block boundary. A so-called TcOffset value (which is defined in the HM) modifies the QP used to determine the Q parameter for the tc threshold depending on the value of the boundary strength.

To illustrate, the HM is configured to first determine this TcOffset used to modify QP in accordance with the following equation (1):

$$\text{Tc Offset}=(BS>2)?\text{DEFAULT\_INTRA}\_{TC}\_\text{OFFSET}(=2):0. \quad (1)$$

According to equation (1), if BS is greater than two, then the current block or neighboring block is intra coded and a TcOffset is equal to the default intra-coded TcOffset ("DEFAULT_INTRA_TC_OFFSET"), which is two. Otherwise, if the BS is less than or equal to two, then the current block is inter-coded and the TcOffset is equal to zero. Next, the video coding device determines a Q value for the $t_c$ threshold in accordance with the following equation (2):

$$t_C:Q=\text{Clip3}(0,\text{MAX\_QP}+4,\text{QP}+\text{TcOffset}). \quad (2)$$

In equation (2), the Q value is determined for the $t_c$ threshold as QP plus the determined TcOffset value, subject to range clipping such that the resulting Q value falls within the range of 0 and MAX_QP+4 (where MAX_QP commonly equals 51).

Next, the current version of the HM may be configured to determine a Q value for the β threshold according to equation (3):

$$\beta:Q=\text{Clip3}(0,\text{MAX\_QP},\text{QP}). \quad (3)$$

Equation (3) sets the value of Q to the value of QP subject to clipping the resulting Q value such that it falls within the range of zero to the constant MAX_QP. Using the determined Q value for both the $t_c$ and β thresholds, the current version of HM may lookup the respective values of the tc and β thresholds in the following Table 1:

TABLE 1

| Q | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|----|----|----|----|----|----|----|----|----|
| β | 0 | 0 | 0 | 0 | 0 | 0 | 0 | 0 | 0 | 0 | 0 | 0 | 0 | 0 | 0 | 0 | 6 | 7 | 8 |
| $t_C$ | 0 | 0 | 0 | 0 | 0 | 0 | 0 | 0 | 0 | 0 | 0 | 0 | 0 | 0 | 0 | 0 | 0 | 0 | 1 |
| Q | 19 | 20 | 21 | 22 | 23 | 24 | 25 | 26 | 27 | 28 | 29 | 30 | 31 | 32 | 33 | 34 | 35 | 36 | 37 |
| β | 9 | 10 | 11 | 12 | 13 | 14 | 15 | 16 | 17 | 18 | 20 | 22 | 24 | 26 | 28 | 30 | 32 | 34 | 36 |
| $t_C$ | 1 | 1 | 1 | 1 | 1 | 1 | 1 | 1 | 1 | 2 | 2 | 2 | 2 | 3 | 3 | 3 | 3 | 4 | 4 | 4 |
| Q | 38 | 39 | 40 | 41 | 42 | 43 | 44 | 45 | 46 | 47 | 48 | 49 | 50 | 51 | 52 | 53 | 54 | 55 |
| β | 38 | 40 | 42 | 44 | 46 | 48 | 50 | 52 | 54 | 56 | 58 | 60 | 62 | 64 | 64 | 64 | 64 | 64 |
| $t_C$ | 5 | 5 | 6 | 6 | 7 | 8 | 9 | 9 | 10 | 10 | 11 | 11 | 12 | 12 | 13 | 13 | 14 | 14 |

Using the values for the tc and β thresholds, the HM may be configured to determine whether to perform de-blocking with respect to a given upper or left boundary and determine de-blocking filtering strength. A similar process (and possibly the same process) may be specified in the current proposed version of HEVC for use in performing video decoding. The current proposed version of HEVC is document HCTVC-J1003_d7, Bross et al., "High Efficiency Video Coding (HEVC) Text Specification Draft 8," Joint Collaborative Team on Video Coding (JCT-VC) of ITU-T SG16 WP3 and ISO/IEC JTC1/SC29/WG11, 10$^{th}$ Meeting: Stockholm, Sweden, Jul. 11, 2012 to Jul. 20, 2012.

In the current proposed version of HEVC and HM, however, the de-blocking filter behavior cannot be influenced by an encoder in order to improve subjective quality or improve bit rate efficiency. To mitigate this restriction, recent proposals for modifying the current version of HEVC have suggested slice-level signaling of a slice_tc_offset and slice_beta_offset that enable modification of de-blocking filter behavior. Although this proposal demonstrates Bjontegaard Delta-rate gains (BD-rate gains) while maintaining subjective quality similar to the anchor sequences (defined for the fourth version of the test model referred to as "HM4"), the signaling of one slice_tc_offset and one slice_beta_offset, which are transform size independent, may not be the most efficient solution, because of the significantly different subjective quality degradation associated with block artifacts corresponding with different transform sizes (4×4, 8×8, 16×16, 32×32). Therefore, the impact of applying one offset to the QP value may have a different subjective or BD-rate impact for each transform type.

A statically defined tc offset and β offset with respect to transform size may not fully enable encoders to define suitable offsets to promote subjective perceived video quality and/or promote coding gains for all transform sizes.

In accordance with the techniques defined in this disclosure, the techniques may enable a video coding device (such as a video encoder or a video decoder) to perform de-blocking of edges between video blocks based on a size of a transform used to transform residual video data from the spatial domain to a frequency domain. For example, the techniques may enable video encoder 20 and/or video decoder 30 to select various offsets used in determining whether to perform de-blocking based on the size of the transform used to transform these residual data blocks. Moreover, the techniques may enable video encoder 20 and/or video decoder 30 to select various offsets used in determining whether to perform de-blocking based not only on the size of the transform but also on whether the current video block was intra- or inter-coded. The techniques of this disclosure may further improve perceived visual quality of the resulting video data after encoding, subsequent decoding and display. The techniques may also promote coding gains in terms of the size of resulting encoded video data in comparison to encoded video data generated using conventional techniques.

Instead of signaling a single slice_tc_offset and slice_beta_offset in the slice header, video encoder 20 may implement the techniques described in this disclosure to signal up to one slice_tc_offset and one slice_beta_offset per transform type (4×4, 8×8, 16×6, 32×32) in the slice header. In case of a shared edge between blocks X and Y, with X on the left or above Y, the transform type of block Y may be used or a rule may be applied to the transform types (sizes) of X and Y, for example, to determine minimum/maximum/average transform size (which may also be referred to as a "type") from X and Y. In addition to transform dependency, the slice_tc_offset and slice_beta_offset may be signaled separately for intra or inter coding modes. In some instances, when rectangular transform types (which are often referred to as "non-square quadtree transforms" or "NSQT") are employed, the equivalent square transform type can be used. For example, non-square transform sizes of 32×8 may be equated to a transform size of 16×16 and non-square transform size 16×4 may be equated to a transform size of 8×8 for purposes of performing various aspects of the techniques described in this disclosure. That is, the QP defined for a 32×8 transform is the same as that defined for 16×16 transform, while the QP for the 16×4 transform is the same as that defined for the 8×8 transform. Thus, the QP for the 8×8 square transform can be used for the non-square 16×4 transform.

Additionally, to support these various forms of determining at least one offset used in determining whether to perform de-blocking filtering of the reconstructed block of video data or used in determining de-blocking filtering strength based on the size of the applied transform, the techniques may provide for various ways by which to signal these offsets in one or more of a picture parameter set (PPS), a sequence parameter set (SPS), an adaptation parameter set (APS) and a slice header (each of which may be specified in a bitstream representative of the encoded video data). For example, a flag may be signaled in the PPS that indicates whether or not de-blocking filter control information (such as one or more of the various offsets noted above) is specified in one or more slice headers associated with the PPS. This flag may be specified in the PPS as a de-blocking_filter_control_present_flag syntax element.

As another example, rather than signal these various slice_tc_offsets and slice_beta_offsets in the slice header, the techniques may enable similar offsets to be specified in the PPS or an APS, thereby reducing slice overhead in that PPSes or APSes may be signaled less frequently than the rate at which slice headers occur in a bitstream representative of the encoded video data. In some examples, the various slice_tc_offsets and slice_beta_offsets described as potentially being signaled in the slice header may be signaled in the APS without changing their respective names considering that these offsets apply to slices associated with the APS. The APS generally specifies adaptations to currently specified syntax elements, hence the name adaptation parameter set. In other words, a previous slice header may have specified one or more of these offsets and a subsequent APS (in decoding order) may specify an adaptation that adds, removes, or otherwise alters or replaces one of the offsets specified by the previous slice header. Moreover, a subsequent APS (in decoding order) may specify adaptations that update previously adapted offsets. The adaptations may apply until another slice header provides for new offsets (which replaces all of the currently adapted offsets with the offsets specified in the slice header) or another APS modifies the current offsets. In some examples, the various slice_tc_offsets and slice_beta_offsets described as potentially being signaled in the slice header may be signaled in the PPS.

In operation, video encoder 20 may apply a transform to a block of the video data to generate a block of transform coefficients in the manner described above. This transform may be associated with or otherwise identified by a transform unit (TU) in accordance with HEVC, which may be included within a coding unit (CU) specifying a coding node that references the block of video data, as described in more detail below. That is, generally, HEVC provides a framework for recursively identifying blocks of video data, where a largest coding unit (LCU) may denote the starting size of the block. HEVC may then recursively partition this LCU until a smallest coding unit is reached or no further partition is required (which in either case is referred to as a coding unit or CU). Often, determining that no further partition is required involves an analysis, such as a rate-distortion optimization (RDO) analysis that involves coding each of block at each recursive level, comparing those various encodings in terms of bitrate provided and distortion introduced and selecting the CUs that provide a RDO that fits a given encoding profile. The CU may include a coding block that identifies the block of video data, a TU defining one or more transforms that are applied to the block of video data and a prediction unit (PU) that defines prediction data, such as motion vectors, reference picture lists and other data related to performing inter- or intra-prediction.

As noted above, the TU may identify one or more transforms that are applied to the block of video data identified by the coding node. The TU may define two or more transforms that are each applied to the same block of video data, where the block of video data may be partitioned into separate transform regions to which the same or different sized transforms are applied. The size of the transforms applied may affect a number of other aspects of video coding. For example, video encoder 20 may apply a quantization parameter that varies based on a size of the applied transform to quantize the block of transform coefficients.

In any event, after performing quantization, video encoder 20 may reconstruct the block of video data from the quantized block of transform coefficients and then determine whether to perform de-blocking filtering to filter the reconstructed block of video data. Video encoder 20 may determine at least one offset used in determining whether to perform de-blocking filtering of the reconstructed block of video data or used in determining de-blocking filtering strength based on the size of the applied transform, which provides another example of transform size affecting various aspects of video coding. This process of determining whether to perform de-blocking filtering is described in more detail below. Video encoder 20 may then perform de-blocking filtering on the reconstructed block of video data based on the determined at least one offset. Video encoder 20 may then specify a flag in a picture parameter set (PPS) that indicates whether the at least one offset is specified as at least one syntax element in a header of an independently decodable unit (e.g., a slice) that includes an encoded version of the block of video data. In some instances, this flag may be denoted in syntax tables as a "de-blocking_filter_control_present_flag" syntax element.

In some instances, video encoder 20 may not signal or otherwise specify the flag in the PPS and instead may provide the at least one offset in a so-called adaptation parameter set (APS). In other instances, video encoder 20 may specify the flag, but set the flag so as to indicate that the at least one offset is not specified as at least one syntax element in the header of the slice that includes the encoded version of the block of video data. Video encoder 20 may after specifying this flag then specify the at least one offset in the APS, where setting the flag to indicate that the at least one offset is not specified in the header of the slice indicates that the at least one offset is specified in the APS.

By specifying this flag, video encoder 20 may facilitate subsequent decoder operation and potentially reduce complexity, as video decoder 30 may not be required to determine the at least one offset itself, but rather may retrieve or extract this offset from either the slice header or the APS. In other words, rather than have to imply the values for the at least one offset, which may involve complicated operations, video decoder 30 may retrieve these values. Although HEVC attempts to promote increased efficiency in coding video data in comparison to previous video coding standards (hence the name "high efficiency video coding"), such as H.264/AVC, reducing complexity may in some instances promote more efficient decoder operation, which in certain circumstances may override HEVCs overarching goal to promote coding efficiency.

Moreover, by providing for signaling (which may be construed as equivalent to specifying in this disclosure and should not be construed to imply real-time or near-real-time signaling) of the at least one offset in the APS, the techniques may promote coding efficiency in that APSes commonly occur in the bitstream less frequently than slice headers. Thus, by only signaling the at least one offset in the APS, the techniques may reduce overhead associated with signaling or otherwise specifying the at least one offset.

Figure 2:
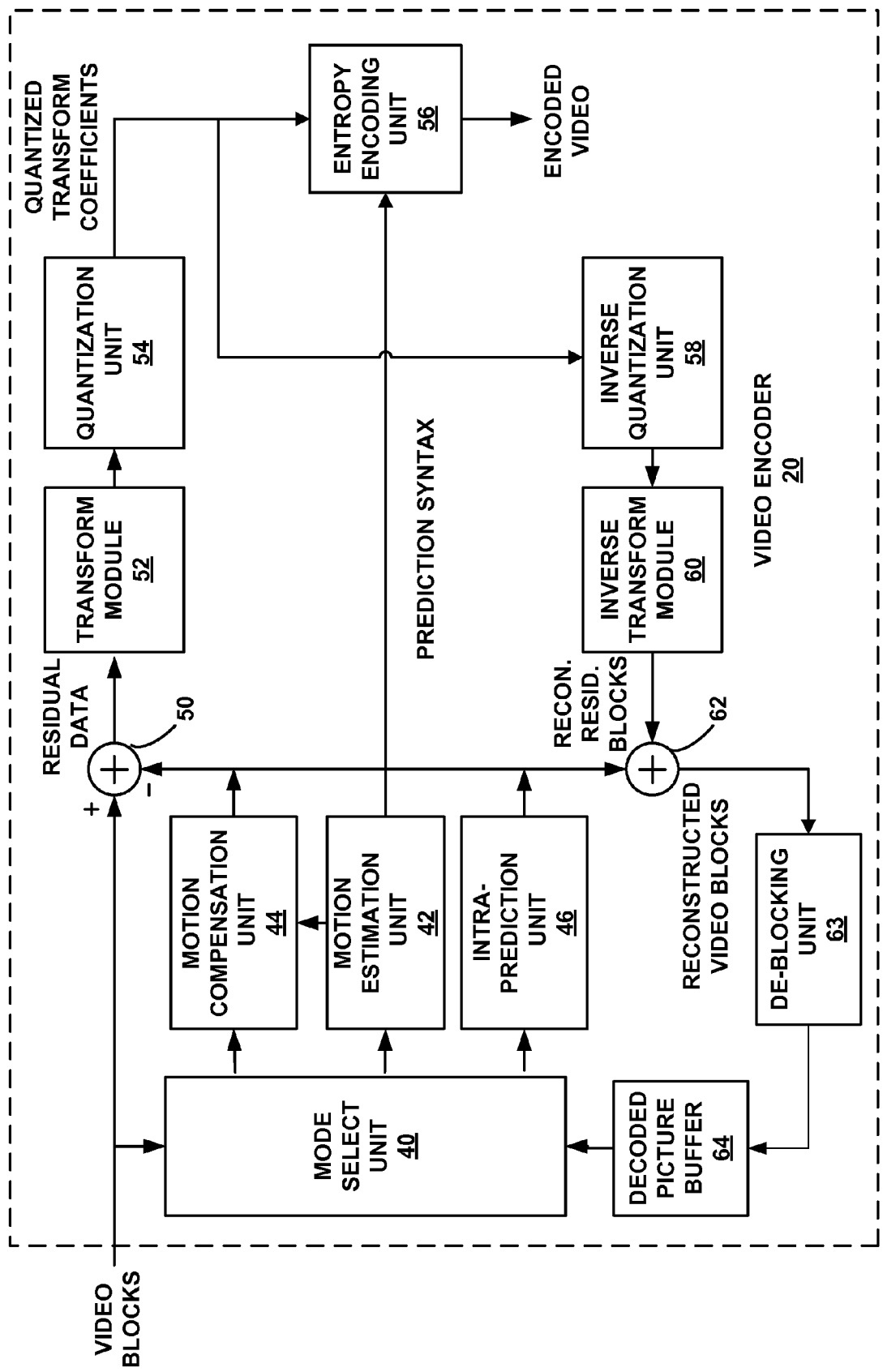
FIG. 2 is a block diagram illustrating an example video encoder that performs various aspects of the techniques described in this disclosure.

FIG. 2 is a block diagram illustrating an example of a video encoder 20 that may perform the techniques described in this disclosure to facilitate application of de-blocking filters. The video encoder 20 will be described in the context of HEVC coding for purposes of illustration, but without limitation of this disclosure as to other coding standards or methods. The video encoder 20 may perform intra- and inter-coding of CUs within video frames. Intra-coding relies on spatial prediction to reduce or remove spatial redundancy in video data within a given video frame. Inter-coding relies on temporal prediction to reduce or remove temporal redundancy between a current frame and previously coded frames of a video sequence.

Intra-mode (I-mode) may refer to any of several spatial-based video compression modes. Inter-modes such as uni-directional prediction (P-mode) or bi-directional prediction (B-mode) may refer to any of several temporal-based video compression modes.

As shown in FIG. 2, the video encoder 20 receives a current video block within a video frame to be encoded. In the example of FIG. 2, the video encoder 20 includes a motion compensation unit 44, a motion estimation unit 42, an intra-prediction unit 46, a decoded picture buffer 64, a summer 50, a transform module 52, a quantization unit 54, and an entropy encoding unit 56. The transform module 52 illustrated in FIG. 2 is the unit that applies the actual transform or combinations of transform to a block of residual data, and is not to be confused with block of transform coefficients, which also may be referred to as a transform unit (TU) of a CU. For video block reconstruction, the video encoder 20 also includes an inverse quantization unit 58, an inverse transform module 60, and a summer 62.

During the encoding process, the video encoder 20 receives a video frame or slice to be coded. The frame or slice may be divided into multiple video blocks, e.g., largest coding units (LCUs). The motion estimation unit 42 and the motion compensation unit 44 perform inter-predictive coding of the received video block relative to one or more blocks in one or more reference frames to provide temporal compression. The intra-prediction unit 46 may perform intra-predictive coding of the received video block relative to one or more neighboring blocks in the same frame or slice as the block to be coded to provide spatial compression.

The mode select unit 40 may select one of the coding modes, intra or inter, e.g., based on rate and error (i.e., distortion) results for each mode, and provides the resulting intra- or inter-predicted block (e.g., a prediction unit (PU)) to the summer 50 to generate residual block data and to the summer 62 to reconstruct the encoded block for use in a reference frame. Summer 62 combines the predicted block with inverse quantized, inverse transformed data from inverse transform module 60 for the block to reconstruct the encoded block, as described in greater detail below. Some video frames may be designated as I-frames, where all blocks in an I-frame are encoded in an intra-prediction mode. In some cases, the intra-prediction unit 46 may perform intra-prediction encoding of a block in a P- or B-frame, e.g., when a motion search performed by the motion estimation unit 42 does not result in a sufficient prediction of the block.

The motion estimation unit 42 and the motion compensation unit 44 may be highly integrated, but are illustrated separately for conceptual purposes. Motion estimation (or motion search) is the process of generating motion vectors, which estimate motion for video blocks. A motion vector, for example, may indicate the displacement of a prediction unit in a current frame relative to a reference sample of a reference frame. The motion estimation unit 42 calculates a motion vector for a prediction unit of an inter-coded frame by comparing the prediction unit to reference samples of a reference frame stored in the decoded picture buffer 64. A reference sample may be a block that is found to closely match the portion of the CU including the PU being coded in terms of pixel difference, which may be determined by sum of absolute difference (SAD), sum of squared difference (SSD), or other difference metrics. The reference sample may occur anywhere within a reference frame or reference slice, and not necessarily at a block (e.g., coding unit) boundary of the reference frame or slice. In some examples, the reference sample may occur at a fractional pixel position.

The motion estimation unit 42 sends the calculated motion vector to the entropy encoding unit 56 and the motion compensation unit 44. In particular, the motion estimation unit 42 may utilize the above-described merge candidates to signal the motion vector according to a merge mode (i.e., signal the index of a neighbor block from which to copy a motion vector). The portion of the reference frame identified by a motion vector may be referred to as a reference sample. The motion compensation unit 44 may calculate a prediction value for a prediction unit of a current CU, e.g., by retrieving the reference sample identified by a motion vector for the PU.

The intra-prediction unit 46 may intra-predict the received block, as an alternative to inter-prediction performed by the motion estimation unit 42 and the motion compensation unit 44. The intra-prediction unit 46 may predict the received block relative to neighboring, previously coded blocks, e.g., blocks above, above and to the right, above and to the left, or to the left of the current block, assuming a left-to-right, top-to-bottom encoding order for blocks. The intra-prediction unit 46 may be configured with a variety of different intra-prediction modes. For example, the intra-prediction unit 46 may be configured with a certain number of directional prediction modes, e.g., thirty-five directional prediction modes, based on the size of the CU being encoded.

The intra-prediction unit 46 may select an intra-prediction mode by, for example, calculating error values for various intra-prediction modes and selecting a mode that yields the lowest error value. Directional prediction modes may include functions for combining values of spatially neighboring pixels and applying the combined values to one or more pixel positions in a PU. Once values for all pixel positions in the PU have been calculated, the intra-prediction unit 46 may calculate an error value for the prediction mode based on pixel differences between the PU and the received block to be encoded. The intra-prediction unit 46 may continue testing intra-prediction modes until an intra-prediction mode that yields an acceptable error value is discovered. The intra-prediction unit 46 may then send the PU to the summer 50.

The video encoder 20 forms a residual block by subtracting the prediction data calculated by the motion compensation unit 44 or the intra-prediction unit 46 from the original video block being coded. The summer 50 represents the component or components that perform this subtraction operation. The residual block may correspond to a two-dimensional matrix of pixel difference values, where the number of values in the residual block is the same as the number of pixels in the PU corresponding to the residual block. The values in the residual block may correspond to the differences, i.e., error, between values of co-located pixels in the PU and in the original block to be coded. The differences may be chroma or luma differences depending on the type of block that is coded.

The transform module 52 may form one or more transform units (TUs) from the residual block. The transform module 52 selects a transform from among a plurality of transforms (often of different sizes, such as 8×8, 16×16, 8×16, 16×8, etc.). The transform may be selected based on one or more coding characteristics, such as block size, coding mode, or the like. The transform module 52 then applies the selected transform to the TU, producing a video block comprising a two-dimensional array of transform coefficients. In addition, the transform module 52 may signal the selected transform partition in the encoded video bitstream.

The transform module 52 may send the resulting transform coefficients to the quantization unit 54. The quantization unit 54 may then quantize the transform coefficients. The entropy encoding unit 56 may then perform a scan of the quantized transform coefficients in the matrix according to a scanning mode. This disclosure describes the entropy encoding unit 56 as performing the scan. However, it should be understood that, in other examples, other processing units, such as the quantization unit 54, could perform the scan.

Once the transform coefficients are scanned into the one-dimensional array, the entropy encoding unit 56 may apply entropy coding such as CAVLC, CABAC, syntax-based context-adaptive binary arithmetic coding (SBAC), or another entropy coding methodology to the coefficients.

To perform CAVLC, the entropy encoding unit 56 may select a variable length code for a symbol to be transmitted. Codewords in VLC may be constructed such that relatively shorter codes correspond to more likely symbols, while longer codes correspond to less likely symbols. In this way, the use of VLC may achieve a bit savings over, for example, using equal-length codewords for each symbol to be transmitted.

To perform CABAC, the entropy encoding unit 56 may select a context model to apply to a certain context to encode symbols to be transmitted. The context may relate to, for example, whether neighboring values are non-zero or not. The entropy encoding unit 56 may also entropy encode syntax elements, such as the signal representative of the selected transform. Following the entropy coding by the entropy encoding unit 56, the resulting encoded video may be transmitted to another device, such as the video decoder 30, or archived for later transmission or retrieval.

In some cases, the entropy encoding unit 56 or another unit of the video encoder 20 may be configured to perform other coding functions, in addition to entropy coding. For example, the entropy encoding unit 56 may be configured to determine coded block pattern (CBP) values for CU's and PU's. Also, in some cases, the entropy encoding unit 56 may perform run length coding of coefficients.

The inverse quantization unit 58 and the inverse transform module 60 apply inverse quantization and inverse transformation, respectively, to reconstruct the residual block in the pixel domain, e.g., for later use as a reference block. The motion compensation unit 44 may calculate a reference block by adding the residual block to a predictive block of one of the frames of the decoded picture buffer 64. The motion compensation unit 44 may also apply one or more interpolation filters to the reconstructed residual block to calculate sub-integer pixel values for use in motion estimation. The summer 62 adds the reconstructed residual block to the motion compensated prediction block produced by the motion compensation unit 44 to produce a reconstructed video block for storage in the decoded picture buffer 64. Video encoder 20 may also include a de-blocking unit 63, which may apply or other a de-blocking filter to perform de-blocking filtering in accordance with various aspects of the techniques described in this disclosure. This filter may be applied to filter the decoded blocks in order to remove blockiness artifacts. The reconstructed video block may be used by the motion estimation unit 42 and the motion compensation unit 44 as a reference block to inter-code a block in a subsequent video frame.

In accordance with the techniques described in this disclosure, transform module 52 may apply a transform to a block of the video data to generate a block of transform coefficients in the manner described above. In some instances, transform module 52 may form a number of different TUs from the same block of residual video data, where each of the different TUs identify a different combination of transforms applied to the same residual block of video data.

For example, transform module 52 may receive a residual block of video data of size 16×16. Transform module 52 may generate a first TU indicating that a 16×16 transform was applied to the 16×16 residual video data block and apply the 16×16 transform to the 16×16 video data block, transforming the 16×16 block of video data into a 16×16 block of transform coefficients. Transform module 52 may generate a second TU indicating that four 8×8 transforms were applied to the 16×16 residual video data block and apply the 8×8 transforms to the 16×16 video data block, transforming the 16×16 block of video data into a 16×16 block of transform coefficients. Transform module 52 may generate a third TU indicating that two 16×8 transforms were applied to the 16×16 residual video data block and apply the 16×8 transforms to the 16×16 video data block, transforming the 16×16 block of video data into a 16×16 block of transform coefficients. Transform module 52 may generate a fourth TU indicating that a 8×16 transform were applied to the 16×16 residual video data block and apply the 8×16 transform to the 16×16 video data block, transforming the 16×16 block of video data into a 16×16 block of transform coefficients.

Video encoder 20 may then continue to encode each of the CUs in the manner described above, quantizing the four different versions of the 16×16 block of transform coefficients. Video encoder 20 may next reconstruct each of the block of video data from the quantized block of transform coefficients corresponding to each of the TUs in the manner described above. Mode select unit 40 may then evaluate each of these different versions of the reconstructed blocks of video data to identify which provides, as one example, the rate-distortion optimization that fits a current profile for encoding the video data. Mode select unit 40 may store the selected one of the versions of the reconstructed block of video data into decoded picture buffer 64.

In encoding each of the different versions of the CU (associated with each of the different versions of the TU), quantization unit 54 may apply a quantization parameter that varies based on a size of the applied transform to quantize the block of transform coefficients. After performing quantization, video encoder 20 may reconstruct the block of video data from the quantized block of transform coefficients and then determine whether to perform de-blocking filtering to filter the reconstructed block of video data. More specifically, de-blocking unit 63 may determine at least one offset used in determining whether to perform de-blocking filtering of the reconstructed block of video data or used in determining de-blocking filtering strength based on the size of the applied transform.

For example, de-blocking unit 63 may implement the following pseudo-code to determine whether to perform de-blocking filtering to filter the reconstructed block of video data:

transform_type=N×N (=4×4 or 8×8 or 16×16 or 32×32)
    INTRA_TC_OFFSET=slice_tc_offset_N×N_intra
    INTER_TC_OFFSET=slice_tc_offset_N×N_inter
    INTRA_BETA_OFFSET=slice_beta_offset_N×N_intra
    INTER_BETA_OFFSET=slice_beta_offset_N×N_inter
TcOffset=(Bs>2)?DEFAULT_INTRA_TC_OFFSET
    (=2)+INTRA_TC_OFFSET:INTER_TC_OFFSET
BetaOffset=(Bs>2)?INTRA_BETA_OFFSET: INTER_BETA_OFFSET
$t_C$: Q=Clip3(0, MAX_QP+4, QP+TcOffset)(luma and chroma de-blocking)
$\beta$: Q=Clip3(0, MAX_QP+4, QP+BetaOffset)(luma de-blocking only)

This pseudo-code indicates that slice-level syntax units, slice_tc_offset_N×N_intra, slice_tc_offset_N×N_inter, slice_beta_offset_N×N_intra and slice_beta_offset_N×

N_inter may be defined for any of the transform types listed as being equal to N×N (e.g., 4×4, 8×8, 16×16 and 32×32) and additionally for intra- or inter-coded blocks.

According to the above pseudo-code, de-blocking unit 63 may determine the transform type (which, in this example, refers to the size of the transform applied to each of the different versions of the CU) and set INTRA_TC_OFFSET, INTER_TC_OFFSET, INTRA_BETA_OFFSET and INTER_BETA_OFFSET to the corresponding one of slice_tc_offset_N×N_intra, slice_tc_offset_N×N_inter, slice_beta_offset_N×N_intra and slice_beta_offset_N×N_inter. After setting these offsets, de-blocking unit 63 then determines TcOffset as equal to DEFAULT_INTRA_TC_OFFSET (which equals two) plus INTRA_TC_OFFSET when a determined boundary strength (Bs) is greater than two. De-blocking unit 63 may determine the boundary strength as a function of the pixel values at the boundary to be de-blocked. When the determined boundary strength is not greater than two, de-blocking unit 63 may determine the TcOffset as equal to INTER_TC_OFFSET. De-blocking unit 63 may also, according to the above pseudo-code, determine a BetaOffset as equal to INTRA_BETA_OFFSET when the boundary strength is determined to be greater than two. When not greater than two, de-blocking filter 63 may determine BetaOffset to be equal to INTER_BETA_OFFSET. De-blocking unit 63 may then determine the tc as equal to Q, which itself is equal to a clipped version of the quantization parameter (QP) plus TcOffset, where the range of possible values run from zero to MAX_QP (which is commonly set to 52) plus four. De-blocking unit 63 may then determine the β as equal to Q, which itself is equal to a clipped version of the quantization parameter (QP) plus BetaOffset, where the range of possible values run from zero to MAX_QP (which again is commonly set to 52) plus four. De-blocking unit 63 uses tc for luma and chroma de-blocking and β for luma de-blocking.

Alternatively, de-blocking unit 63 may implement the following pseudo-code, which illustrates applying a mathematical relationship to determine the offsets to the QP value based on the slice-level syntax units, slice_tc_offset_intra, slice_tc_offset_inter, slice_beta_offset_intra, slice_beta_offset_inter:

transform_type=N×N (=4×4 or 8×8 or 16×16 or 32×32)
  a. INTRA_TC_OFFSET=slice_tc_offset_intra+tc_offset_N×N_intra_delta
  b. INTER_TC_OFFSET=slice_tc_offset_inter+tc_offset_N×N_inter_delta
  c. INTRA_BETA_OFFSET=slice_beta_offset_intra+beta_offset_N×N_intra_delta
  d. INTER_BETA_OFFSET=slice_beta_offset_inter+beta_offset_N×N_inter_delta
Tc_offset_N×N_intra_delta=tc_offset_intra_delta*factor_N×N
Tc_offset_N×N_inter_delta=tc_offset_inter_delta*factor_N×N
Beta_offset_N×N_intra_delta=beta_offset_intra_delta*factor_N×N
Beta_offset_N×N_inter_delta=beta_offset_inter_delta*factor_N×N Examples of constant values used in the computation (but that may not signaled):
Factor_4×4=3
Factor_8×8=2
Factor_16×16=1
Factor_32×32=0
Tc_offset_intra_delta=−1
Tc_offset_inter_delta=−1
Beta_offset_intra_delta=−1
Beta_offset_inter_delta=−1
TcOffset=(Bs>2)?DEFAULT_INTRA_TC_OFFSET(=2)+INTRA_TC_OFFSET:INTER_TC_OFFSET
BetaOffset=(Bs>2)?INTRA_BETA_OFFSET:INTER_BETA_OFFSET
$t_C$: Q=Clip3(0, MAX_QP+4, QP+TcOffset)(luma and chroma de-blocking)
β: Q=Clip3(0, MAX_QP+4, QP+BetaOffset)(luma de-blocking only)

In accordance with the preceding pseudo-code, de-blocking unit 63 may determine the TcOffset as a function of the BS, where if BS is greater than two, the video coding device may determine that the value of TcOffset is equal to the DEFAULT_INTRA_TC_OFFSET (which is usually equal to two) plus the determined INTRA_TC_OFFSET, which itself may be equal to any one of the defined slice_tc_offset_N×N_intra (selected based on the size of the block Y in this example). However, if Bs is less than or equal to two, de-blocking unit 63 determines that the value of TcOffset is equal to INTER_TC_OFFSET, which itself may be equal to any one of the defined slice_tc_offset_N×N_inter (selected based on the size of block Y in this example).

Additionally, de-blocking unit 63 may determine a value for BetaOffset also as a function of Bs, where if Bs is greater than two, the video coding device determines that the value of BetaOffset is equal to INTRA_BETA_OFFSET, which itself may be equal to any one of the defined slice_beta_offset_N×N_intra (selected based on the size of the block Y in this example). Alternatively, if Bs is less than or equal to two, the video coding device may determine that the value of BetaOffset is equal to INTER_BETA_OFFSET, which itself may be equal to any one of the defined slice_beta_offset_N×N_inter values (selected based on the size of the block Y in this example).

De-blocking unit 63 may use both the determined TcOffset and BetaOffset in a similar manner to derive respective Q values for looking up the corresponding t, threshold and β threshold according to the pseudo-code or equations denoted above, which are reproduced below in equation format for convenience.

$$t_C: Q=\text{Clip3}(0, \text{MAX\_QP}+4, \text{QP}+\text{TcOffset}) \qquad (4)$$

$$\beta: Q=\text{Clip3}(0, \text{MAX\_QP}+4, \text{QP}+\text{BetaOffset}) \qquad (5)$$

According to equation (4), de-blocking unit 63 determines a Q value for looking up the $t_c$ threshold in the above Table 1 by setting the Q value to the QP plus the determined TcOffset subject to clipping in the range from zero to MAX_QP+4 (where MAX_QP usually equals 51). Likewise, de-blocking unit 63 may determine a Q value for looking up the β threshold in the above Table 1 by setting the Q value to the QP plus the determined BetaOffset subject to clipping in the range from zero to MAX_QP+4 (where MAX_QP usually equals 51). De-blocking unit 63 may then use these thresholds to determine whether de-blocking filtering should be performed with respect to boundaries of a current block of video data. Based on this determination, de-blocking unit 63 performs de-blocking filtering. By enabling more granular definition of offsets used to determine the Q parameter for the tc and β thresholds, the techniques may improve the ability of encoders to control de-blocking so as to promote better control over subject video quality and/or promote coding gain.

In some instances, de-blocking unit 63 may not compute or determine both an INTRA_BETA_OFFSET and an INTER_BETA_OFFSET, but only a single BETA_OFFSET while also determining both the INTRA_TC_OFFSET and the INTER_TC_OFFSET. The following pseudo code illustrates applying a mathematical relationship to determine the offsets to the QP value, in this single BETA_OFFSET instance, based on the slice-level syntax units, slice_tc_offset_intra, slice_tc_offset_intra_delta, slice_tc_offset_inter, slice_tc_offset_inter_delta, and slice_beta_offset.

transform_type=N×N(=4×4 or 8×8 or 16×16 or 32×32)
  e. INTRA_TC_OFFSET=slice_tc_offset_intra+tc_offset_N×N_intra_delta
  f. INTER_TC_OFFSET=slice_tc_offset_inter+tc_offset_N×N_inter_delta
  g. BETA_OFFSET=slice_beta_offset
Tc_offset_N×N_intra_delta=slice_tc_offset_intra_delta*factor_N×N
Tc_offset_N×N_inter_delta=slice_tc_offset_inter_delta*factor_N×N Examples of constant values used in this computation are as follows (where these constants may not be signaled or otherwise specified to the decoder):

Factor_4×4=3
Factor_8×8=2
Factor_16×16=1
Factor_32×32=0

In the instances of a single BETA_OFFSET and both the INTRA_TC_OFFSET and INTER_TC_OFFSET, de-blocking unit 63 may compute TcOffset and the BetaOffset in a slightly different manner as set forth with respect to the following pseudo-code:

TcOffset=(Bs>2)?INTRA_TC_OFFSET:INTER_TC_OFFSET
BetaOffset=BETA_OFFSET

In accordance with this pseudo-code, de-blocking unit 63 determines the TcOffset as a function of the Bs, where if Bs is greater than two, de-blocking unit 63 may determine that the value of TcOffset is equal to the INTRA_TC_OFFSET. However, if Bs is less than or equal to two, de-blocking unit 63 determines that the value of TcOffset is equal to INTER_TC_OFFSET. De-blocking unit 63 uses both the determined TcOffset and BetaOffset in a similar manner to derive respective Q values for looking up the corresponding $t_c$ threshold and β threshold according to the pseudo-code or equations denoted above as equations (4) and (5).

In order for the corresponding decoder, e.g., video decoder 30 shown in the example of FIG. 1, video encoder 20 may signal the various offsets in different portions of the bitstream, such as the SPS, PPS, APS and slice header. The following describes the HEVC syntax modifications that may be required to the current working draft of HEVC so as to support signaling of these offsets as additional syntax elements. While a number of examples are provided below, any method of signaling these syntax elements may be possible to achieve various aspects of the techniques. In addition, various ways of signaling these additional syntax elements may be used depending on a given context and the context may also be signaled so that the video decoder may determine how to appropriately parse the bitstream. Moreover, while in some instances, TcOffset and BetaOffset syntax elements for both intra-coded and inter-coded blocks may be explicitly signaled, in other instances a single TcOffset and a single BetaOffset for one or more transform types may be signaled, where the video decoder derives the intra-coded and inter-coded versions of these offsets from the signaled TcOffset and BetaOffset.

In any event, mode select unit 40 may select the corresponding one of the reconstructed versions of the block of video data, which after being de-blocked, may promote a given encoding profile in terms of rate and distortion. Mode select unit 40 may signal the corresponding offsets that were used to perform de-blocking to entropy encoding unit 56, which may formulate the bitstream representative of the encoded video data. Entropy encoding unit 56 may add the de-blocking_filter_control_present_flag to the picture parameter set (PPS) syntax as illustrated in the following Table 2. If the de-blocking_filter_control_present_flag is equal to 1, this flag specifies that a set of syntax elements controlling the characteristics of the de-blocking filter is present in the slice header. If this flag is equal to 0, then this flag specifies that the set of syntax elements controlling the characteristics of the de-blocking filter is not present in the slice header and their inferred values are to be used by the video decoder. The syntactical description that specifies the parsing process for the flag should be chosen appropriately, such as a single bit.

TABLE 2

```
pic_parameter_set_rbsp( ) {
    pic_parameter_set_id
    seq_parameter_set_id
    ...
    de-blocking_filter_control_present_flag
    ...
    rbsp_trailing_bits( )
}
```

The following tables represent different cases for the syntax of a header of an independently decodable unit, such as a slice (where such syntax may be referred to as "slice header syntax"), which signals the slice_tc_offset and slice_beta_offset values. Alternatively, the offsets can be signaled elsewhere, such as in the Adaptation Parameter Set (APS) or the Picture Parameter Set (PPS). The following Table 3 represents the slice header syntax which contains all tc and beta offsets for each transform type (4×4, 8×8, 16×16, 32×32) and for intra and inter modes. Alternatively, Table 4 and Table 5 illustrate slice header syntax examples with fewer offset elements.

TABLE 3

```
slice_header( ) {
    ...
    if( de-blocking_filter_control_present_flag ) {
        disable_de-blocking_filter_idc
        if( disable_de-blocking_filter_idc != 1 ) {
            slice_tc_offset_4x4_intra
            slice_tc_offset_8x8_intra
            slice_tc_offset_16x16_intra
            slice_tc_offset_32x32_intra
            slice_beta_offset_4x4_intra
            slice_beta_offset_8x8_intra
            slice_beta_offset_16x16_intra
            slice_beta_offset_32x32_intra
            if ( slice_type != I ) {
                slice_tc_offset_4x4_inter
                slice_tc_offset_8x8_inter
                slice_tc_offset_16x16_inter
                slice_tc_offset_32x32_inter
                slice_beta_offset_4x4_inter
                slice_beta_offset_8x8_inter
                slice_beta_offset_16x16_inter
                slice_beta_offset_32x32_inter
            }
        }
    }
}
```

In the following Table 4, entropy encoding unit 56 defines $t_c$ offsets for all of the transform types applied to intra-coded blocks and a single standard β offset is defined for all transform types applied to intra-coded blocks. In addition, if the slice type is not an I-slice (meaning it is a P or B slice), then entropy encoding unit 56 defines $t_c$ offsets for all of the transform types applied to inter-coded blocks and a single standard β offset for all transform types applied to inter-coded blocks.

TABLE 4

```
slice_header( ) {
    ...
    if( de-blocking_filter_control_present_flag ) {
        disable_de-blocking_filter_idc
        if( disable_de-blocking_filter_idc != 1 ) {
            slice_tc_offset_4x4_intra
            slice_tc_offset_8x8_intra
            slice_tc_offset_16x16_intra
            slice_tc_offset_32x32_intra
            slice_beta_offset_intra
            if ( slice_type != I) {
                slice_tc_offset_4x4_inter
                slice_tc_offset_8x8_inter
                slice_tc_offset_16x16_inter
                slice_tc_offset_32x32_inter
                slice_beta_offset_inter
            }
        }
    }
}
```

The following Table 5 defines syntax signaling, whereby entropy encoding unit 56 signals general $t_c$ offsets for all transform types applied to both intra-coded and inter-coded blocks and a single standard β offset for all transform types applied to both intra-coded and inter-coded blocks.

TABLE 5

```
slice_header( ) {
    ...
    if( de-blocking_filter_control_present_flag ) {
        disable_de-blocking_filter_idc
        if( disable_de-blocking_filter_idc != 1 ) {
            slice_tc_offset_4x4
            slice_tc_offset_8x8
            slice_tc_offset_16x16
            slice_tc_offset_32x32
            slice_beta_offset
        }
    }
}
```

In the following slice syntax examples, encoding unit 56 introduces the following two new de-blocking flags:
   de-blocking_offset_intra_inter_flag, which when equal to 0, signals that the same offset is used for intra and inter modes. When equal to 1, this flag indicates that offsets are signaled for intra and inter coding modes.
   de-blocking_offset_transform_flag, which when equal to 0, signals that offsets are transform size independent and, when equal to 1, signals that offsets are transform size dependent.

The following Table 6 and Table 7 illustrate the usage of these two new de-blocking flags for the cases where the beta_offset is transform type dependent and independent.

TABLE 6

```
slice_header( ) {
    ...
    if( de-blocking_filter_control_present_flag ) {
        disable_de-blocking_filter_idc
        if( disable_de-blocking_filter_idc != 1 ) {
            de-blocking_offset_intra_inter_flag
```

TABLE 6-continued

```
            de-blocking_offset_transform_flag
            if ( !slice_offset_intra_inter ) {
                if ( !de-blocking_offset_transform_flag ) {
                    slice_tc_offset
                    slice_beta_offset
                } else {
                    slice_tc_offset_4x4
                    slice_tc_offset_8x8
                    slice_tc_offset_16x16
                    slice_tc_offset_32x32
                    slice_beta_offset
                }
            } else {
                if ( !de-blocking_offset_transform_flag ) {
                    slice_tc_offset_intra
                    slice_beta_offset_intra
                    if (slice_type != I) {
                        slice_tc_offset_inter
                        slice_beta_offset_ inter
                    }
                } else {
                    slice_tc_offset_4x4_intra
                    slice_tc_offset_8x8_intra
                    slice_tc_offset_16x16_intra
                    slice_tc_offset_32x32_intra
                    slice_beta_offset_intra
                    if ( slice_type != I ) {
                        slice_tc_offset_4x4_inter
                        slice_tc_offset_8x8_inter
                        slice_tc_offset_16x16_inter
                        slice_tc_offset_32x32_inter
                        slice_beta_offset_ inter
                    }
                }
            }
        }
    }
}
```

TABLE 7

```
slice_header( ) {
    ...
    if( de-blocking_filter_control_present_flag ) {
        disable_de-blocking_filter_idc
        if( disable_de-blocking_filter_idc != 1 ) {
            de-blocking_offset_intra_inter_flag
            de-blocking_offset_transform_flag
            if ( !slice_offset_intra_inter ) {
                if ( !de-blocking_offset_transform_flag ) {
                    slice_tc_offset
                    slice_beta_offset
                } else {
                    slice_tc_offset_4x4
                    slice_tc_offset_8x8
                    slice_tc_offset_16x16
                    slice_tc_offset_32x32
                    slice_beta_offset_4x4
                    slice_beta_offset_8x8
                    slice_beta_offset_16x16
                    slice_beta_offset_32x32
                }
            } else {
                if ( !de-blocking_offset_transform_flag ) {
                    slice_tc_offset_intra
                    slice_beta_offset_intra
                    if ( slice_type != I ) {
                        slice_tc_offset_inter
                        slice_beta_offset_ inter
                    }
                } else {
                    slice_tc_offset_4x4_intra
                    slice_tc_offset_8x8_intra
                    slice_tc_offset_16x16_intra
                    slice_tc_offset_32x32_intra
                    slice_beta_offset_4x4_intra
                    slice_beta_offset_8x8_intra
```

TABLE 7-continued

```
            slice_beta_offset_16x16_intra
            slice_beta_offset_32x32_intra
            if ( slice_type != I ) {
                slice_tc_offset_4x4_inter
                slice_tc_offset_8x8_inter
                slice_tc_offset_16x16_inter
                slice_tc_offset_32x32_inter
                slice_beta_offset_4x4_inter
                slice_beta_offset_8x8_inter
                slice_beta_offset_16x16_inter
                slice_beta_offset_32x32_inter
            }
        }
      }
    }
  }
}
```

The syntactical description for the tc_offset and beta_offset syntax elements should be chosen appropriately. For example, the tc_offset and beta_offset may be represented as a signed integer Exp-Golomb-coded syntax element. In some instances, these syntax elements may not be explicitly signaled and video decoder 30 may spatially or temporally predict the tc_offset and beta_offset values. In some examples, the various offsets may be quantized according to a given quantization scheme (that may as one example involve dividing these offsets by two).

In the instances of a single BETA_OFFSET and both the INTRA_TC_OFFSET and INTER_TC_OFFSET noted above, entropy encoding unit 56 may signal the syntax units in the manner described below. In a generalized scenario, entropy encoding unit 56 may signal the syntax units in, as one example, the Adaptation Parameter Set (APS) or the Picture Parameter Set (PPS), instead of the slice header or in addition to the slice header. Furthermore, entropy encoding unit 56 may use a mathematical relationship for signaling of the Beta Offset value analogous to that used for the TcOffset value.

Furthermore, in these instances, entropy encoding unit 56 may signal the de-blocking_filter_control_present_flag in the Sequence Parameter Set (SPS), as set forth in the following Table 8:

TABLE 8

```
seq_parameter_set_rbsp( ) {
    ...
    chroma_pred_from_luma_enabled_flag
    de-blocking_filter_control_present_flag
    loop_filter_across_slice_flag
    sample_adaptive_offset_enabled_flag
    adaptive_loop_filter_enabled_flag
    pcm_loop_filter_disable_flag
    ...
}
```

Alternatively, entropy encoding unit 56 may signal the de-blocking _filter_control_present_flag in, for example, the Picture Parameter Set (PPS). The de-blocking_filter_control_present_flag may be represented by one bit.

Moreover, in the implementation using a single BETA_OFFSET and both the INTRA_TC_OFFSET and the INTER_TC_OFFSET, entropy encoding unit 56 may signal the syntax units, slice_tc_offset_intra, slice_tc_offset_intra_delta, slice_tc_offset_inter, slice_tc_offset_inter_delta, and slice_beta_offset in the slice header in accordance with the following Table 9:

TABLE 9

```
Slice_header( ) {
    ...
    if( de-blocking_filter_control_present_flag ) {
        disable_de-blocking_filter_idc
        if( disable_de-blocking_filter_idc != 1 ) {
            slice_beta_offset
            slice_tc_offset_intra
            slice_tc_offset_intra_delta
            if ( slice_type != I ) {
                slice_tc_offset_inter
                slice_tc_offset_inter_delta
            }
        }
    }
}
```

Entropy encoding unit 56 may select an appropriate syntactical description for the syntax elements, such as by selecting a signed integer Exp-Golomb-coded syntax element ("se(v)").

As noted above, the various offsets for $t_c$ and $\beta$ may be signaled in the APS, PPS and/or the slice header. The APS may include parameters associated with the Adaptive Loop Filter (ALF) and the Sample Adaptive Offset (SAO). Recent developments in HEVC have led to the adoption of the APS and signaling of de-blocking filter parameters, including the disable_de-blocking_filter_flag and the de-blocking parameters offsets for $t_c$ and $\beta$ in the APS and/or the slice header.

In some instances, the slice header may include a flag indicating to "inherit", "override" or copy the de-blocking parameters specified in the APS or PPS or to use the parameters signaled in the slice header. The following tables 10-12 respectively specify the Sequence Parameter Set (SPS), APS and slice header syntax as defined in accordance with the techniques of this disclosure. The Proposed column in each of these tables indicates syntax elements that are proposed in support of the techniques described in this disclosure, when marked with an "X," while those marked with a "Y" indicate syntax elements that have been recently proposed and/or adopted by the standards body.

TABLE 10

SPS Parameters

| seq_parameter_set_rbsp( ) { | Descriptor | Proposed |
|---|---|---|
| profile_idc | u(8) | |
| (omitted) | | |
| chroma_pred_from_luma_enabled_flag | u(1) | |
| de-blocking_filter_control_present_flag | u(1) | X |
| if (de-blocking_filter_control_present_flag) { | | X |
|    de-blocking_filter_in_aps_enabled_flag | u(1) | Y |
| Note that if | | X |
| de-blocking_filter_control_present_flag=0, | | |
| then de-blocking_filter_in_aps_enabled_flag=0 and | | |
| aps_de-blocking_filter_flag=0 and | | |
| disable_de-blocking_filter_flag=0 and | | |
| beta_offset_div2=0 and tc_offset_div2=0 are | | |
| inferred | | |
| } | | |
| loop_filter_across_slice_flag | u(1) | |
| sample_adaptive_offset_enabled_flag | u(1) | |
| adaptive_loop_filter_enabled_flag | u(1) | |
| pcm_loop_filter_disable_flag | u(1) | |
| cu_qp_delta_enabled_flag | u(1) | |
| temporal_id_nesting_flag | u(1) | |
| inter_4x4_enabled_flag | u(1) | |
| rbsp_trailing_bits( ) | | |
| } | | |

As noted in Table 10 above, when the de-blocking_filter_control_present flag equals zero, then de-blocking_filter_ in_aps_enabled_flag equals zero, aps_deblocking_filter_flag equals zero, disable_de-blocking_filter_flag equals zero, beta_offset_div2 equals zero and tc_offset_div2 equals zero may be inferred. As a result, one or more of these entries may be omitted in certain contexts in the APS and/or slice header, which is reflected in the tables below by striking through these entries in the tables.

TABLE 11

APS Parameters

| aps_rbsp( ) { | Descriptor | Proposed |
|---|---|---|
| aps_id | ue(v) | |
| aps_de-blocking_filter_flag | u(1) | Y |
| aps_sample_adaptive_offset_flag | u(1) | |
| aps_adaptive_loop_filter_flag | u(1) | |
| if( aps_sample_adaptive_offset_flag \|\| | | |
| aps_adaptive_loop_filter_flag ) { | | |
|     aps_cabac_use_flag | u(1) | |
|     if( aps_cabac_use_flag ) { | | |
|         aps_cabac_init_idc | ue(v) | |
|         aps_cabac_init_qp_minus26 | se(v) | |
|     } | | |
| } | | |
| if (aps_de-blocking_filter_flag){ | | Y |
|     disable_de-blocking_filter_flag | u(1) | Y |
|     if (!disable_de-blocking_filter_flag) { | | Y |
|         beta_offset_div2 | se(v) | Y |
|         ~~tc_offset_div2~~ | ~~se(v)~~ | ~~Y~~ |
|         tc_offset_intra_div2 | se(v) | X |
|         tc_offset_intra_delta | se(v) | X |
|         tc_offset_inter_div2 | se(v) | X |
|         tc_offset_inter_delta | se(v) | X |
|     } | | |
| } | | |
| .... | | |

Referring first to Table 10, the parameter "de-blocking_filter_in_aps_enabled_flag," when set to a value of zero, indicates that de-blocking parameters are present in the slice header, whereas, when set to a value of one, indicates that de-blocking parameters are present in APS. Referring next to Table 11, the parameter "aps_de-blocking_filter_flag" indicates that de-blocking parameters are present in the APS (when set to a value of one) or not present (when set to a value of zero). In both Table 11 and Table 12, the parameter "disable_de-blocking_filter_flag," when set to a value zero, indicates that the de-blocking_filter is enabled and, when set to a value of one, indicates that the de-blocking filter is disabled. In both Table 11 and Table 12, the "beta_offset_div2" and "tc_offset_div2" parameters may refer to offsets that are added to the QP that is used to lookup $t_C$ and $\beta$ thresholds (where the parameters are divided by 2). In Table 12, the parameter "inherit_dbl_params_from_APS_flag," when set to a value of one, indicates that de-blocking parameters in APS shall be used and, when set to a value of zero, indicates that de-blocking parameters that follow in the slice header shall be used.

Entropy encoding unit 56 may specify additional parameters in either the SPS, PPS, APS or slice header in accordance with the techniques described in this disclosure. For example, referring to Table 10, entropy encoding unit 56 may specify a "de-blocking_filter_control_present_flag" in the SPS or PPS, where this parameter, when set to a value of one, indicates that de-blocking parameters are present in the APS, PPS and/or slice header and, when set to a value of zero, indicates that no de-blocking parameters are present in the APS, PPS and slice header and that default de-blocking parameters shall be used. As another example, referring to Table 11 and Table 12, entropy encoding unit 56 may specify

TABLE 12

Slice Header Parameters

| slice_header( ) { | Descriptor | Proposed |
|---|---|---|
|   entropy_slice_flag | u(1) | |
|   if( !entropy_slice_flag ) { | | |
|     slice_type | ue(v) | |
|     pic_parameter_set_id | ue(v) | |
|     if( sample_adaptive_offset_enabled_flag \|\| | | |
| adaptive_loop_filter_enabled_flag \|\| de- | | |
| blocking_filter_in_aps_enabled_flag ) | | Y |
|       aps_id | ue(v) | |
|     frame_num | u(v) | |
|     if( IdrPicFlag ) | | |
|       idr_pic_id | ue(v) | |
|     .... | u(v) | |
|   if( !entropy_slice_flag ) { | | |
|     slice_qp_delta | se(v) | |
|     if (de-blocking_filter_control_present_flag) { | | X |
|       inherit_dbl_params_from_APS_flag | u(1) | Y |
|         if (!inherit_dbl_params_from_APS_flag){ | | Y |
|         disable_de-blocking_filter_flag | u(1) | Y |
|           if (!disable_de-blocking_filter_flag) { | | Y |
|             beta_offset_div2 | se(v) | Y |
|             ~~tc_offset_div2~~ | ~~se(v)~~ | ~~Y~~ |
|             tc_offset_intra_div2 | se(v) | X |
|             tc_offset_intra_delta | se(v) | X |
|             if ( slice_type !=I ) { | | X |
|               tc_offset_inter_div2 | se(v) | X |
|               tc_offset_inter_delta | se(v) | X |
|             } | | X |
|           } | | Y |
|         } | | Y |
|     } | | X |
| ..... | | | the "tc_offset_intra_div2," "tc_offset_intra_delta," "tc_offset_inter_div2," and "tc_offset_inter_delta" parameters in the APS, PPS and/or slice header, where usage of these de-blocking filter parameters is illustrated with respect to the following pseudo-code:

transform_type=N×N (=4×4 or 8×8 or 16×16 or 32×32)
   a.   INTRA_TC_OFFSET=(2×tc_offset_intra_div2)+tc_offset_N×N_intra_delta
   b.   INTER_TC_OFFSET=(2×tc_offset_inter_div2)+tc_offset_N×N_inter_delta
   c. BETA_OFFSET=2×beta_offset_div2
Tc_offset_N×N_intra_delta=tc_offset_intra_delta×factor_N×N
Tc_offset_N×N_inter_delta=tc_offset_inter_delta×factor_N×N
Examples of constant values used in the computation (not signaled)
   d. Factor_4×4=0
   e. Factor_8×8=1
   f. Factor_16×16=2
   g. Factor_32×32=3
   IF (Intra Mode) THEN TcOffset=DEFAULT_INTRA_TC_OFFSET(=2)+INTRA_TC_OFFSET; ELSE TcOffset=INTER_TC_OFFSET
   BetaOffset=BETA_OFFSET
   $t_C$: Q=Clip3(0, MAX_QP+DEFAULT_INTRA_TC_OFFSET, QP+TcOffset) (luma and chroma de-blocking)
   β: Q=Clip3(0, MAX_QP, QP+BetaOffset) (luma de-blocking only)

The above pseudo-code generally indicates that the INTRA_TC_OFFSET may equal two times the tc_offset_intra_div2 parameter plus the tc_offset_N×N_intra_delta parameter. In addition, this pseudo-code indicates that the INTER_TC_OFFSET may equal two times the tc_offset_inter_div2 parameter plus the tc_offset_N×N_inter_delta parameter, while the BETA_OFFSET may equal two times the beta_offset_div2 parameter. Moreover, the Tc_offset_N×N_intra_delta may equal the tc_offset_intra_delta parameter times a factor_N×N, examples of which are listed in the pseudo-code above. Furthermore, the Tc_offset_N×N_inter_delta parameter may equal the tc_offset_inter_delta times the factor_N×N. Entropy encoding unit 56 may implement the above pseudo-code to signal the various parameters.

The remaining portions of the pseudo-code following the various examples of the factors indicate that if the mode is intra mode, then the TcOffset is equal to the DEFAULT_INTRA_TC_OFFSET (which equals two) plus the INTRA_TC_OFFSET. However, if the mode is not the Intra Mode, then the TcOffset is equal to INTER_TC_OFFSET. The BetaOffset is equal to the BETA_OFFSET. According to this pseudo-code, the Q value is determined for the $t_c$ threshold as QP plus the determined TcOffset value, subject to range clipping such that the resulting Q value falls within the range of 0 and MAX_QP+DEFAULT_INTRA_TC_OFFSET (where MAX_QP commonly equals 51). Likewise, the Q value is determined for the β threshold as QP plus the determined BetaOffset value, subject to range clipping such that the resulting Q value falls within the range of 0 and MAX_QP (where again MAX_QP commonly equals 51).

In addition to techniques described above with respect to Tables 10-12, the de-blocking_offset_intra_inter_flag (see above) to signal separate offset parameters for intra and inter can be introduced into the SPS, PPS, APS or slice header (e.g., see the following Tables 13 and 14).

TABLE 13

APS Parameters

| aps_rbsp( ) { | Descriptor | Proposed |
|---|---|---|
|   aps_id | ue(v) | |
|   aps_de-blocking_filter_flag | u(1) | Y |
|   aps_sample_adaptive_offset_flag | u(1) | |
|   aps_adaptive_loop_filter_flag | u(1) | |
|   if( aps_sample_adaptive_offset_flag || aps_adaptive_loop_filter_flag ) { | | |
|     aps_cabac_use_flag | u(1) | |
|     if( aps_cabac_use_flag ) { | | |
|       aps_cabac_init_idc | ue(v) | |
|       aps_cabac_init_qp_minus26 | se(v) | |
|     } | | |
|   } | | |
|   if (aps_de-blocking_filter_flag){ | | Y |
|     disable_de-blocking_filter_flag | u(1) | Y |
|     if (!disable_de-blocking_filter_flag) { | | Y |
|       ~~beta_offset_div2~~ | ~~se(v)~~ | ~~Y~~ |
|       ~~tc_offset_div2~~ | ~~se(v)~~ | ~~Y~~ |
|       de-blocking_offset_intra_inter_flag | u(1) | X |
|       if (de-blocking_offset_intra_inter_flag) { | | X |
|         beta_offset_intra_div2 | se(v) | X |
|         beta_offset_inter_div2 | se(v) | X |
|         tc_offset_intra_div2 | se(v) | X |
|         tc_offset_intra_delta | se(v) | X |
|         tc_offset_inter_div2 | se(v) | X |
|         tc_offset_inter_delta | se(v) | X |
|       } else { | | X |
|         beta_offset_div2 | se(v) | X |
|         tc_offset_div2 | se(v) | X |
|         tc_offset_delta | se(v) | X |
|       } | | X |
|     } | | Y |
|   } | | Y |
| .... | | |

TABLE 14

Slice Parameters

| slice_header( ) { | Descriptor | Proposed |
|---|---|---|
|   entropy_slice_flag | u(1) | |
|   if( !entropy_slice_flag ) { | | |
|     slice_type | ue(v) | |
|     pic_parameter_set_id | ue(v) | |
|     if( sample_adaptive_offset_enabled_flag \|\| adaptive_loop_filter_enabled_flag \|\| de-blocking_filter_in_aps_enabled_flag ) | | Y |
|       aps_id | ue(v) | |
|     frame_num | u(v) | |
|     if( IdrPicFlag ) | | |
|       idr_pic_id | ue(v) | |
|     .... | u(v) | |
|   if( !entropy_slice_flag ) { | | |
|     slice_qp_delta | se(v) | |
|     if (de-blocking_filter_control_present_flag) { | | X |
|       inherit_dbl_params_from_APS_flag | u(1) | Y |
|       if (!inherit_dbl_params_from_APS_flag){ | | Y |
|         disable_de-blocking_filter_flag | u(1) | Y |
|         if (!disable_de-blocking_filter_flag) { | | Y |
|           ~~beta_offset_div2~~ | ~~se(v)~~ | ~~Y~~ |
|           ~~tc_offset_div2~~ | ~~se(v)~~ | ~~Y~~ |
|           de-blocking_offset_intra_inter_flag | u(1) | X |
|           if (de-blocking_offset_intra_inter_flag) { | | X |
|             beta_offset_intra_div2 | se(v) | X |
|             tc_offset_intra_div2 | se(v) | X |
|             tc_offset_intra_delta | se(v) | X |
|             if ( slice_type !=I) { | | X |
|               beta_offset_inter_div2 | se(v) | X |
|               tc_offset_inter_div2 | se(v) | X |
|               tc_offset_inter_delta | se(v) | X |
|             } | | X |
|           } else { | | X |
|             beta_offset_div2 | se(v) | X |
|             tc_offset_div2 | se(v) | X |
|             tc_offset_delta | se(v) | X |
|           } | | X |
|         } | | Y |
|       } | | Y |
|     } | | X |
| ..... | | |

In some alternatives, entropy encoding unit 56 may signal the de-blocking_filter_control_present_flag and the de-blocking_filter_in_aps_enabled_flag in the PPS. An example of PPS syntax is shown in the following Table 15, which may be overridden by specifying parameters in the slice header (or a header of an independently decodable unit) as shown with respect to the example slice header syntax of Table 16:

TABLE 15

PPS Parameters

| ... | | |
|---|---|---|
| de-blocking_filter_control_present_flag | u(1) | |
| if( de-blocking_filter_control_present_flag ) { | | |
|   de-blocking_filter_override_enabled_flag | u(1) | |
|   pps_disable_de-blocking_filter_flag | u(1) | |
|   if( !pps_disable_de-blocking_filter_flag ) { | | |
|     pps_beta_offset_div2 | se(v) | |
|     pps_tc_offset_div2 | se(v) | |
|   } | | |
| } | | |
| ... | | |

TABLE 16

Slice Header Syntax

| ... | |
|---|---|
| if( de-blocking_filter_control_present_flag ) { | |
|   if( de-blocking_filter_override_enabled_flag ) | |
|     de-blocking_filter_override_flag | u(1) |
|   if( de-blocking_filter_overriding_flag ) { | |
|     slice_header_disable_de-blocking_filter_flag | u(1) |
|     if( !disable_de-blocking_filter_flag ) { | |
|       slice_header_beta_offset_div2 | se(v) |
|       slice_header_tc_offset_div2 | se(v) |
|     } | |
|   } | |
| } | |
| ... | |

The de-blocking offset parameters that modify the QP value (average of QP values of neighboring P and Q blocks as set forth in B. Bross, W.-J. Han, J.-R. Ohm, G. J. Sullivan, T. Wiegand, "High efficiency video coding (HEVC) text specification draft 7," 9th JCT-VC Meeting, Geneva, Switzerland, April-May 2012, Doc. JCTVC-I1003_d4) before looking up the $t_C$ or beta thresholds are: pps_beta_offset_div2, pps_tc_offset_div2, slice_header_beta_offset_div2, slice_header_tc_offset_div2. Neither of these offset parameters may support transform size dependent control of the de-blocking filter strength, while subjective quality evaluations have demonstrated that certain video sequences may suffer from severe blocking artifacts that are transform size dependent. These observed blocking artifacts may be visible at relatively high QP values (for example, for QP values that exceed 30) and for the maximum transform size as specified by the SPS syntax parameters log 2_diff_max_min_transform_block_size and log 2_min_transform_block_size_minus2. These large blocking artifacts may be most visible if the maximum transform size is 32×32; however, the blocking artifacts may also be visible if the maximum transform size is 16×16 or 8×8, while potentially less visible for transform size 4×4.

Therefore, the techniques described in this disclosure may enable entropy encoding unit 56 to signal specific de-blocking adjustment parameters to control the de-blocking strength in case that at least one of two adjacent video blocks P and Q are included in a transform unit with the maximum transform size. In other words, the techniques of this disclosure may adjust the deblocking filter strength in cases where at least one of two adjacent video blocks P and Q is included in a transform unit with the maximum transform size. The common edge between blocks P and Q is typically subject to de-blocking filtering. If neither video block P or Q is included in a maximum sized transform unit, then the current de-blocking adjustment parameters apply. The following Tables 17 and 18 specify the changes to the PPS syntax and slice header syntax, where changes are shown using gray highlighting.

TABLE 17

PPS Syntax

...
   de-blocking_filter_control_present_flag     u(1)
   if( de-blocking_filter_control_present_flag ) {
      de-blocking_filter_override_enabled_flag     u(1)
      pps_disable_de-blocking_filter_flag     u(1)
      if( !pps_disable_de-blocking_filter_flag ) {
         pps_beta_offset_div2     se(v)
         pps_tc_offset_div2     se(v)
         pps_beta_offset_max_tu_div2     se(v)
         pps_tc_offset_max_tu_div2     se(v)
      }
   }
...

TABLE 18

Slice Header Syntax

...
   if( de-blocking_filter_control_present_flag ) {
      if( de-blocking_filter_override_enabled_flag )
         de-blocking_filter_override_flag     u(1)
      if( de-blocking_filter_overriding_flag ) {
         slice_header_disable_de-blocking_filter_flag     u(1)
         if( !disable_de-blocking_filter_flag ) {
            slice_header_beta_offset_div2     se(v)
            slice_header_tc_offset_div2     se(v)
            slice_header_beta_offset_max_tu_div2     se(v)
            slice_header_tc_offset_max_tu_div2     se(v)
         }
      }
   }
...

The semantics of the proposed syntax parameters is as follows (parameter values are inferred to be 0 if not present):

pps_beta_offset_max_tu_div2/slice_header_beta_offset_max_tu_div2 specify the default de-blocking parameter offset for β (divided by 2) that is applied to edges of the maximum transform unit size in pictures referring to the picture parameter set unless the default de-blocking parameter offset for β is overridden by the de-blocking parameter offset present in the slice header for pictures referring to the picture parameter set.

pps_tc_offset_max_tu_div2/slice_header_tc_offset_max_tu_div2 specify the default de-blocking parameter offset for $t_C$ (divided by 2) that is applied to edges of the maximum transform unit size in pictures referring to the picture parameter set unless the default de-blocking parameter offset for $t_C$ is overridden by the de-blocking parameter offset present in the slice header for pictures referring to the picture parameter set.

The semantics of the other related de-blocking adjustment parameters are as follows:

pps_beta_offset_div2/slice_header_beta_offset_div2 and pps_tc_offset_div2/slice_header_tc_offset_div2 specify the default de-blocking parameter offsets for β and $t_C$ (divided by 2) that are applied to edges of transform units that are not also edges of the maximum transform unit size in pictures referring to the picture parameter set unless the default de-blocking parameter offsets are overridden by the de-blocking parameter offsets present in the slice header for pictures referring to the picture parameter set.

The proposed de-blocking adjustment parameters for maximum transform unit sizes are specified in the following pseudo-code (pps_or slice_prefixes are omitted for brevity; QP is average value of the QP values of blocks P and Q):

IF (P or Q are included in maximum transform unit size) THEN TC_OFFSET=tc_offset_max_tu_div2; ELSE INTRA_TC_OFFSET=tc_offset_div2
   IF (P or Q are included in maximum transform unit size) THEN BETA_OFFSET=beta_offset_max_tu_div2; ELSE BETA_OFFSET=beta_offset_div2
   IF (P or Q have MODE_INTRA) THEN TcOffset=DEFAULT_INTRA_TC_OFFSET(=2)+ TC_OFFSET; ELSE TcOffset=TC_OFFSET
   BetaOffset=BETA_OFFSET
   $t_C$: Q=Clip3(0, MAX_QP+DEFAULT_INTRA_TC_OFFSET, QP+TcOffset) (luma and chroma de-blocking)
   β: Q=Clip3(0, MAX_QP, QP+BetaOffset) (luma de-blocking only)

In some instances, only one or both of the proposed beta_offset_max_tu_div2 and tc_offset_max_tu_div2 parameters may be signaled. Also note that the "div2" or divided by 2 scaling of the proposed parameters may be optional, because other scaling factors or integer offsets (for example_minusX with X an integer) may be used, or no scaling may be used (beta_offset_max_tu and tc_offset_max_tu).

The proposed beta_offset_max_tu_div2 and tc_offset_max_tu_div2 parameters above may be applied independently from intra or inter coding mode of the coding unit that contains the transform units. Alternatively, the proposed parameters may be intra or inter coding mode dependent. For example, the parameters beta_offset_intra_max_tu_div2 and/or beta_offset_inter_max_tu_div2 and/or tc_offset_intra_max_tu_div2 and/or tc_offset_inter_max_tu_div2 may be signaled in a similar manner as specified in the syntax examples above. The signaling of separate parameters for intra or inter mode may depend on an enable flag such as de-blocking_offset_intra_inter_flag as illustrated in previous aspects of the techniques described above. The following rule may be applied to determine whether to use intra or inter parameters for de-blocking the common edge between video blocks P and Q: if P or Q (or both) are in an intra-coded coding unit, then the intra parameters apply to the edge, otherwise, the inter parameters apply.

Alternatively, the proposed techniques may further improve upon a proposal set forth in D.-K. Kwon, M. Budagavi, "Transform size dependent deblocking filter," 9th JCT-VC Meeting, Geneva, Switzerland, April-May 2012, Doc. JCTVC-I0244, which suggests computing an additional boundary strength value 3 (or other number) in addition to the values 0 to 2 that are computed in the HM7 deblocking filter set forth in B. Bross, W.-J. Han, J.-R. Ohm, G. J. Sullivan, T. Wiegand, "High efficiency video coding (HEVC) text specification draft 7," 9th JCT-VC Meeting, Geneva, Switzerland, April-May 2012, Doc. JCTVC-I1003_d4. In accordance with the techniques described in this disclosure, the boundary strength is set to a value of 3 if at least one of the neighboring P or Q blocks is included in an intra-coded coding unit and if at least one of the intra-coded blocks (P and/or Q) is included in a transform unit of maximum size, for example, 32×32 or 16×16, etc.

If boundary strength value equals 3, then the deblocking adjustment parameters for maximum transform unit sizes (beta_offset_max_tu_div2 and/or beta_offset_intra_max_tu_div2 and/or tc_offset_max_tu_div2 and/or tc_offset_intra_max_tu_div2) set forth in accordance with the techniques described in this disclosure are employed as beta and $t_C$ offsets; otherwise, tc_offset_div2 and beta_offset_div2 are used.

Alternatively, if boundary strength value equals 3, then the strong deblocking filter is applied; otherwise, the weak filter is applied. In this case, the deblocking adjustment parameters for maximum transform_unit_sizes (beta_offset_max_tu_div2 and/or beta_offset_intra_max_tu_div2 and/or tc_offset_max_tu_div2 and/or tc_offset_intra_max_tu_div2) specified in accordance with the techniques described in this disclosure are not applied nor signaled, and tc_offset_div2 and/or beta_offset_div2 are applied.

Alternatively, if boundary strength value equals 3, then the strong deblocking filter is applied; otherwise, the weak filter is applied. In this case, the deblocking adjustment parameters for maximum transform_unit_sizes (beta_offset_max_tu_div2 and/or beta_offset_intra_max_tu_div2 and/or tc_offset_max_tu_div2 and/or tc_offset_intra_max_tu_div2) are applied to the strong deblocking filter, and tc_offset_div2 and/or beta_offset_div2 are applied to the weak deblocking filter.

Additional boundary strength values may be computed for the inter-coded case. For example, if neither block P or Q are intra-coded, and at least one of the P or Q blocks is included in a transform unit of maximum size, then an additional boundary strength value is defined, for example, value 4. Similar to the intra cases above, the proposed deblocking adjustment parameters for maximum transform_unit_sizes (beta_offset_max_tu_div2 and/or beta_offset_inter_max_tu_div2 and/or tc_offset_max_tu_div2 and/or tc_offset_inter_max_tu_div2) are applied.

In some instances, the transform units of maximum size may need to contain at least one non-zero coded coefficient before applying the proposed beta_offset_max_tu_div2 and tc_offset_max_tu_div2 parameters to adjust the de-blocking strength. This may be checked using the coded block flag (cbf).

In addition to the proposed parameters, a flag may be signaled to enable their signaling and/or the proposed functionality. The following Tables 19 and 20 illustrate the syntax changes, where again the changes are denoted using gray highlighting:

TABLE 19

PPS syntax

| | |
|---|---|
| ... | |
| de-blocking_filter_control_present_flag | u(1) |
| if( de-blocking_filter_control_present_flag ) { | |
|   de-blocking_filter_override_enabled_flag | u(1) |
|   pps_disable_de-blocking_filter_flag | u(1) |
|   if( !pps_disable_de-blocking_filter_flag ) { | |
|     pps_beta_offset_div2 | se(v) |
|     pps_tc_offset_div2 | se(v) |
|     de-blocking_max_tu_offset_enabled_flag | u(1) |
|     if (de-blocking_max_tu_offset_enabled_flag) { | |
|       pps_beta_offset_max_tu_div2 | se(v) |
|       pps_tc_offset_max_tu_div2 | se(v) |
|     } | |
|   } | |
| } | |
| ... | |

TABLE 20

Slice Header Syntax

| | |
|---|---|
| ... | |
| if( de-blocking_filter_control_present_flag ) { | |
|   if( de-blocking_filter_override_enabled_flag ) | |
|     de-blocking_filter_override_flag | u(1) |
|   if( de-blocking_filter_overriding_flag ) { | |
|     slice_header_disable_de-blocking_filter_flag | u(1) |
|     if( !disable_de-blocking_filter_flag ) { | |
|       slice_header_beta_offset_div2 | se(v) |
|       slice_header_tc_offset_div2 | se(v) |
|       if (de-blocking_max_tu_offset_enabled_flag) { | |
|         slice_header_beta_offset_max_tu_div2 | se(v) |
|         slice_header_tc_offset_max_tu_div2 | se(v) |
|       } | |
|     } | |
|   } | |
| } | |
| ... | |

The semantics of the de-blocking_max_tu_offset_enabled_flag may be any of the following alternatives:
    de-blocking_max_tu_offset_enabled_flag may enable the signaling of the beta_offset_max_tu_div2 or tc_offset_max_tu_div2 syntax parameters if the flag value is equal to 1; otherwise, these parameters are not signaled and their value is inferred to be equal to 0.
    de-blocking_max_tu_offset_enabled_flag may enable the signaling of the parameters beta_offset_max_tu_div2 or tc_offset_max_tu_div2 syntax parameters if the flag value is equal to 1, otherwise, these parameters are not signaled and their value is inferred to be equal to the corresponding beta_offset_div2 and tc_offset_div2 parameters that are inferred to be equal to 0 if not present.

In some instances, the techniques may be used in conjunction with techniques described in U.S. Provisional Patent Application 61/662,833, filed Jun. 21, 2012, the entire contents of which are hereby incorporated in this disclosure, where the present techniques modify the beta-curves and $t_C$-curves described in the above-incorporated Provisional Patent Application to increase de-blocking strength.

In some instances, an additional boundary strength value 3 (or other number) in addition to the values 0 to 2 that are computed in the HM7 deblocking filter may be computed, where HM7 refers to the following document by B. Bross, W.-J. Han, J.-R. Ohm, G. J. Sullivan, T. Wiegand, entitled "High efficiency video coding (HEVC) text specification draft 7," 9th JCT-VC Meeting, Geneva, Switzerland, April-May 2012, Doc. JCTVC-I1003_d4, the entire contents of which are hereby incorporated by reference.

In these instances, the boundary strength is set to a value of 3 if at least one of the neighboring P or Q blocks is included in an intra-coded coding unit and if at least one of the intra-coded blocks (P and/or Q) is included in a transform unit of maximum size, for example 32×32 or 16×16, etc. As opposed to one or more of the above described aspects of the techniques, if boundary strength value equals 3, then a constant $t_C$ offset (constant_max_tu_tc_offset) and/or beta offset (constant_max_tu_beta_offset) is applied, which may be further modified through, for example, signaling tc_offset_div2 and beta_offset_div2.

The following illustrates an example of how the video coder may determine these values (and subsequently signal these values in the bitstream):

IF (P or Q have MODE_INTRA) AND (P or Q are included in maximum transform unit size) THEN TC_OFFSET=constant_max_tu_tc_offset+2*tc_offset_div2; ELSE TC_OFFSET=2*tc_offset_div2

IF (P or Q have MODE_INTRA) AND (P or Q are included in maximum transform unit size) THEN BETA_OFFSET=constant_max_tu_beta_offset+2*beta_offset_div2; ELSE BETA_OFFSET=2*beta_offset_div2

Optionally; IF (P or Q have MODE_INTRA) THEN TcOffset=DEFAULT_INTRA_TC_OFFSET(=2)+TC_OFFSET; ELSE TcOffset=TC_OFFSET BetaOffset=BETA_OFFSET $t_C$: Q=Clip3(0, MAX_QP+DEFAULT_INTRA_TC_OFFSET, QP+TcOffset) (luma and chroma deblocking)

β: Q=Clip3(0, MAX_QP, QP+BetaOffset) (luma deblocking only)

Alternatively, the video coder may determine these values in the manner that follows:

IF (P has MODE_INTRA and P is included in maximum transform unit size) or (Q has MODE_INTRA and Q is included in maximum transform unit size) THEN TC_OFFSET=constant_max_tu_tc_offset+2*tc_offset_div2; ELSE TC_OFFSET=2*tc_offset_div2

IF (P has MODE_INTRA and P is included in maximum transform unit size) or (Q has MODE_INTRA and Q is included in maximum transform unit size) THEN BETA_OFFSET=constant_max_tu_beta_offset+2*beta_offset_div2; ELSE BETA_OFFSET=2*beta_offset_div2

Optionally; IF (P or Q have MODE_INTRA) THEN TcOffset=DEFAULT_INTRA_TC_OFFSET(=2)+TC_OFFSET; ELSE TcOffset=TC_OFFSET BetaOffset=BETA_OFFSET $t_C$: Q=Clip3(0, MAX_QP+DEFAULT_INTRA_TC_OFFSET, QP+TcOffset) (luma and chroma deblocking)

β: Q=Clip3(0, MAX_QP, QP+BetaOffset) (luma deblocking only)

The video coder may determine or compute additional boundary strength values for the inter-coded case. For example, if neither block P or Q are intra-coded, and at least one of the P or Q blocks is included in a transform unit of maximum size, then an additional boundary strength value may be defined (e.g., a value of 4). Similar to the intra cases described above, a constant $t_C$ offset (constant_max_tu_tc_offset) and/or beta offset (constant_max_tu_beta_offset) is applied, which may be further modified through, for example, signaling tc_offset_div2 and beta_offset_div2.

In some instances, the video coder may assign a boundary strength value of 3 (or other value) if at least one P or Q block is included in a transform unit of maximum size without checking inter or intra mode of block P or Q. Similar to the intra cases above, a constant $t_C$ offset (constant_max_tu_tc_offset) and/or beta offset (constant_max_tu_beta_offset) is applied, which may be further modified through, for example, signalling tc_offset_div2 and beta_offset_div2.

Another aspect of the techniques may, as described above, incorporate the additional boundary (Bs) values based on block P or Q being included in a transform unit (TU) or a transform block (TB) of the maximum allowed size that is specified in the SPS through syntax elements log 2 min_transform_block_size_minus2 and log 2_diff_max_min_transform_block_size. This aspect of the techniques may differ from the aspect described above in that the video coder sets the boundary strength to a value of 4 (or other appropriate value) if at least one of the neighboring P or Q blocks is included in an intra-coded coding unit (CU) and if at least one of the intra-coded blocks (P and/or Q) is included in a TU or TB of maximum size (e.g., 32×32, 16×16, etc.). Otherwise, the video coder sets the BS value to a value of 3 (or other appropriate value) when at least one of the P or Q blocks is included in a TB of maximum size. If neither of these conditions are met, the video coder may compute the Bs value in accordance with that defined in HEVC.

The following pseudo-code illustrates the Bs derivation:

IF (P has MODE_INTRA and P is included in maximum TB size) or (Q has MODE_INTRA and Q is included in maximum TB size) THEN Bs=4, ELSE IF (P is included in maximum TB size) or (Q is included in maximum TB size) THEN Bs=3, ELSE IF (P or Q have MODE_INTRA) THEN Bs=2, ELSE further Bs derivation follows HEVC specification.

In some instances, the video coder may simplify the above process by adding only one Bs value, for example, Bs equal to 3 using the following pseudo-code:

IF (P is included in maximum TB size) or (Q is included in maximum TB size) THEN Bs=3, ELSE IF (P or Q have MODE_INTRA) THEN Bs=2, ELSE further Bs derivation follows HEVC specification.

In some instances, the video coder may implement the boundary strength value computation to include a check of whether block P or Q is included in a TB size that is greater (or equal) than a minimum size N×M (or N×N) instead of only the maximum TB size. The following pseudo-code may illustrate this variation of the boundary strength value computation:

IF (P has MODE_INTRA and P is included in TB size>=N×M) or (Q has MODE_INTRA and Q is included in TB size>=N×M) THEN Bs=4, ELSE IF (P is included in TB size>=N×M) or (Q is included in TB size>=N×M) THEN Bs=3, ELSE IF (P or Q have MODE_INTRA) THEN Bs=2, ELSE further Bs derivation follows HEVC specification.

For this variation, video encoder 20 may signal a high-level syntax parameter in a SPS, PPS or slice header (or any other header or parameter set) that identifies the minimum TB size N×M (or N×N).

The following specifies the dependency of the deblocking filter on the additional Bs values. In general, the video coder increases the deblocking filter strength if Bs is greater than a value of 2 compared with the current operation of the HEVC deblocking filter. In accordance with this aspect of the techniques described in this disclosure, if the video coder set the Bs equal to a value 3 or 4, then the video coder modifies the clipping operation of the "weak" or "normal" deblocking filter specified in HEVC to increase weak filter strength. The following pseudo-code illustrates the "weak" filter operation and the impact of the Bs value (where p0, q0 may represent samples at the edge boundary to be deblocking filtered and where p1 and q1 may represent samples adjacent to p0, q0):

HEVC Weak filter delta:
    $\Delta=(9(q0-p0)-3(q1-p1)+8)/16$
    IF ($\Delta<10t_c$) Remark: alternative preferred threshold value is $6t_c$
        $\delta$=Clip3(-c1, c1, $\Delta$) Remark: Clip3(a, b, x) clips value x to [a, b] interval
        p0'=Clip(p0+$\delta$) Remark: Clip(x) clips value x to input sample bit depth
        q0'=Clip(q0-$\delta$)
    If modify p1:
        $\Delta p$=Clip3(-c2, c2, ((p2+p0+1)/2-p1+$\delta$)2)
        p1'=Clip(p1+$\Delta p$)
    If modify q1:
        $\Delta q$=Clip3(-c2, c2, ((q2+q0+1)/2-q1-$\delta$)/2)
        q1'=Clip(q1+$\Delta q$)
Default filter clipping thresholds [6]
    c1=$t_C$
    c2=$t_C/2$ (Note: alternative preferred threshold value is $t_C/4$)
Filter clipping thresholds c1 and c2 are modified as follows depending on the Bs value and maximum TU or TB size (Log 2MaxTUsize)
    If (Bs>2 && Log 2MaxTUsize>2)
        c1=$4t_C$
        c2=$2t_C$ (Note: alternative threshold values are possible)

In some instances, the "weak" filter clipping thresholds are dependent on the Bs value and also on the maximum TU size (Log 2MaxTUsize). The purpose of the latter condition may be to prevent the clipping range from increasing in instances where the maximum TU size is small (e.g., 4×4). This may, therefore, set a lower limit. In some instances, the latter condition specified above is not checked. In other instances, the lower limit may be signaled as a parameter in the high-level syntax.

In this manner, a video coding device may be configured to determine one or more deblocking filter clipping thresholds based on a boundary strength value, perform a clipping operation with respect to a deblocking filter using the determined one or more deblocking filter clipping thresholds to determine a clipped deblocking filter and apply the clipped de-blocking filter to a block of the video data.

In some instances, the video coding device may be configured to determine the boundary strength value based on whether one or more of the block of the video data and a block adjacent to the block of the video data are included in a block of the video data of a specified size in the manner described above.

In some instances, the video coding device may be configured to determine the boundary strength value based on whether one or more of the block of the video data and a block adjacent to the block of the video data are included in a transform unit of a specified size, again as described above.

The video coding device may also, in some instances, be configured to determine the one or more deblocking filter clipping thresholds based on the boundary strength value and a maximum size of a block determined for a portion of the video data that includes the block of the video data.

In some instances, the video coding device comprises a video encoding device, such as video encoder 20. The block of video data may, in this instance, comprise a reconstructed block of video data that is reconstructed by the video encoding device from an encoded version of the block of video data. Video encoder 20 may be configured to, when applying the clipped de-blocking filter, apply the clipped de-blocking filter to the reconstructed block of the video data to generate a de-blocking filtered reconstructed block of video data. Video encoder 20, as described in detail in this disclosure, may also be configured to store the de-blocking filtered reconstructed block of video data to a memory for use as a reference block when encoding other blocks of video data.

In other instances, the video coding device may comprise a video decoding device, such as video decoder 30. In this instance, the block of video data may comprises a reconstructed block of video data that is reconstructed by the video decoding device from an encoded version of the block of video data. Video decoder 30 may be configured to, when applying the clipped de-blocking filter, apply the clipped de-blocking filter to the reconstructed block of the video data to generate a de-blocking filtered reconstructed block of video data, and to store the de-blocking filtered reconstructed block of video data to a memory for use as a reference block when decoding other blocks of video data.

In addition, the following deblocking filter parameters $t_c$ and beta may be determined as follows:
    TC_OFFSET=2*tc_offset_div2
    BETA_OFFSET=2*beta_offset_div2
    IF (Bs=2 or Bs=4) THEN TcOffset=DEFAULT_INTRA_TC_OFFSET(=2)+TC_OFFSET; ELSE TcOffset=TC_OFFSET (Note: P or Q is intra coded if Bs=2 or 4)
    BetaOffset=BETA_OFFSET
    $t_C$: Q=Clip3(0, MAX_QP+DEFAULT_INTRA_TC_OFFSET, QP+TcOffset) (luma and chroma deblocking)
    $\beta$: Q=Clip3(0, MAX_QP, QP+BetaOffset) (luma deblocking only)

Compared to HEVC where chroma deblocking filter is performed for Bs=2 (P or Q is intra-coded), the foregoing aspects of the techniques perform chroma deblocking filtering when Bs=2 or Bs=4.

In some instances, video encoder 20 may signal the deblocking control parameters beta_offset_max_tu_div2 and tc_offset_max_tu_div2 parameters in a manner similar to that described above to adjust the deblocking strength for Bs values 3 and/or 4. The following exemplary pseudo-code may illustrate this operation:
    IF (Bs=3 or Bs=4) THEN TC_OFFSET=2*tc_offset_max_tu_div2, ELSE TC_OFFSET=2*tc_offset_div2
    IF (Bs=3 or Bs=4) THEN BETA_OFFSET=2*beta_offset_max_tu_div2, ELSE BETA_OFFSET=2*beta_offset_div2
    IF (Bs=2 or Bs=4) THEN TcOffset=DEFAULT_INTRA_TC_OFFSET(=2)+TC_OFFSET; ELSE TcOffset=TC_OFFSET (Note: P or Q is intra coded if Bs=2 or 4)
    BetaOffset=BETA_OFFSET
    $t_C$: Q=Clip3(0, MAX_QP+DEFAULT_INTRA_TC_OFFSET, QP+TcOffset) (luma and chroma deblocking)
    $\beta$: Q=Clip3(0, MAX_QP, QP+BetaOffset) (luma deblocking only)

In this manner, the video coding device may further be configured to determine the one or more deblocking filter clipping thresholds based on the boundary strength value and a maximum size of a transform unit determined for a portion of the video data that includes the block of the video data. In some instances, the video coding device may further be configured to, when the boundary strength value is greater than two and the maximum size of the transform unit is greater than a first threshold (e.g., a value of two), determine a first deblocking filter clipping threshold as a multiple of an offset used in determining whether to perform de-blocking filtering of the block of video data or used in determining de-blocking filtering strength. The video coding device may, when the boundary strength value is greater than two and the maximum size of the transform unit is greater than a second threshold (which may be the same as the first threshold, e.g., a value of two), be configured to determine a second deblocking filter clipping threshold as a multiple of the offset used in determining whether to perform de-blocking filtering of the block of video data or used in determining de-blocking filtering strength. The video coding device, in this instance, may be configured to, when performing the clipping operation, perform the clipping operation with respect to the deblocking filter using the determined first and second deblocking filter clipping thresholds to determine the clipped deblocking filter.

The video coding device may be further configured to, when performing the clipping operation, perform the clipping operation with respect to a normal deblocking filter using the determined one or more deblocking filter clipping thresholds to determine a clipped normal deblocking filter. Moreover, the video coding device may be further configured to, when applying the clipped de-blocking filter, apply the clipped normal deblocking filter to the block of the video data.

The video coding device may additionally be configured to determine the boundary strength value based on whether one or more of the block of the video data and a block adjacent to the block of the video data are included in a transform unit of a specified size and determine to apply a chroma deblocking filter to a chroma portion of the block of video data when the determined boundary strength value equals four.

The video coding device may be configured to determine the boundary strength value based on whether one or more of the block of the video data and a block adjacent to the block of the video data are included in a transform unit of a specified size, determine whether a size of the transform applied to the block of video data is a maximum transform unit size. Upon determining that the size of the transform applied to the block of video data is the maximum transform unit size, the video coding device may be configured to determine one or more of a maximum tc offset and a maximum β offset that are used in place of a tc offset and a β offset that are otherwise used in determining whether to perform de-blocking filtering of the block of the video data when the size of the transform applied to the block of video data is not a maximum transform unit size.

The video coding device may be further configured to specify a flag in a picture parameter set (PPS) that indicates whether one or more of the tc offset and the β offset is specified as at least one syntax element in one or both of the PPS and a header of an independently decodable unit that includes the block of video data in the manner described above. The flag may comprise the above described de-blocking_filter_control_present_flag that indicates whether one or more of the tc offset and the β offset is specified as the at least one syntax element in one or both of the PPS and the header of the independently decodable unit that includes the encoded version of the block of video data.

Figure 3:
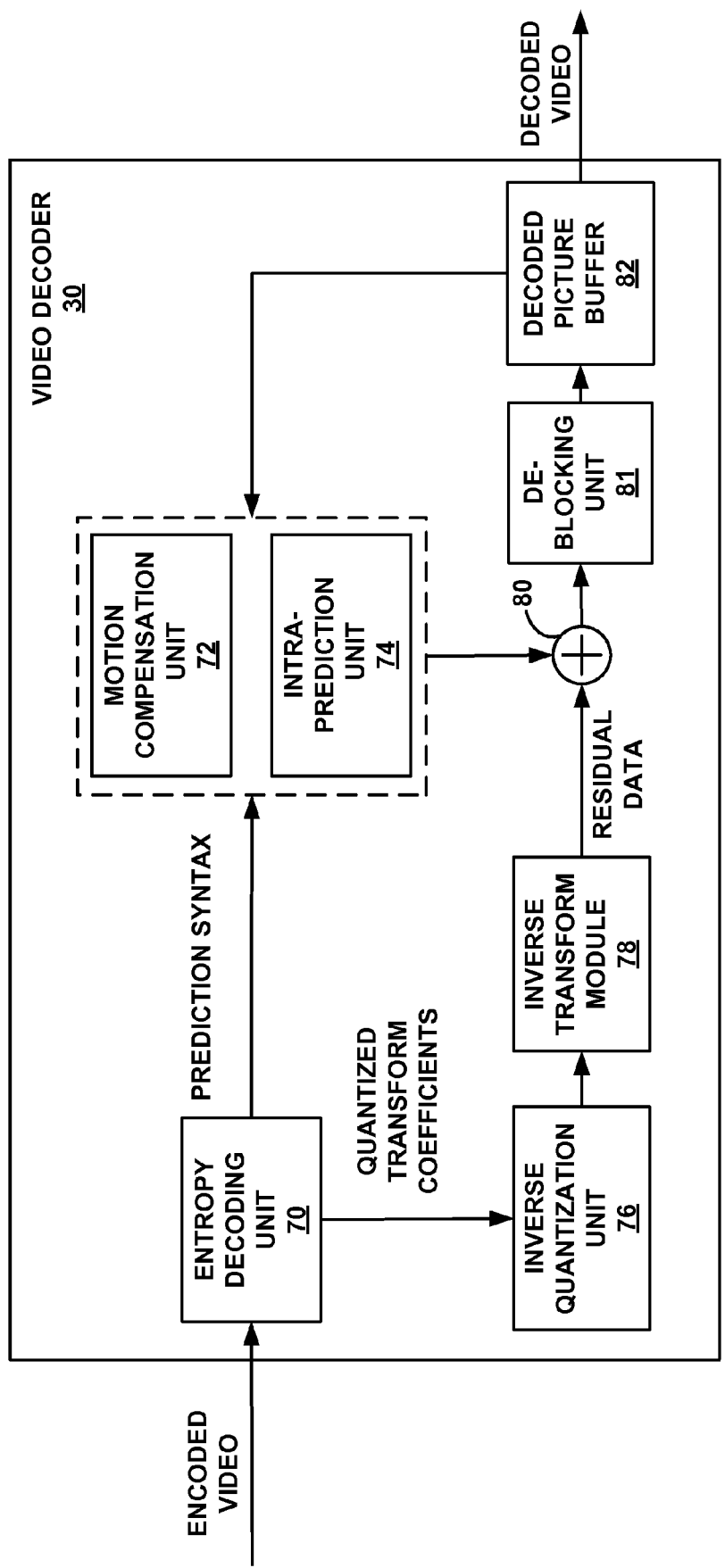
FIG. 3 is a block diagram illustrating an example video decoder that performs various aspects of the techniques described in this disclosure.

FIG. 3 is a block diagram illustrating an example of a video decoder 30, which decodes an encoded video sequence. In the example of FIG. 3, the video decoder 30 includes an entropy decoding unit 70, a motion compensation unit 72, an intra-prediction unit 74, an inverse quantization unit 76, an inverse transformation unit 78, a decoded picture buffer 82 and a summer 80. The video decoder 30 may, in some examples, perform a decoding pass generally reciprocal to the encoding pass described with respect to the video encoder 20 (see FIG. 2).

The entropy decoding unit 70 performs an entropy decoding process on the encoded bitstream to retrieve a one-dimensional array of transform coefficients. The entropy decoding process used depends on the entropy coding used by the video encoder 20 (e.g., CABAC, CAVLC, etc.). The entropy coding process used by the encoder may be signaled in the encoded bitstream or may be a predetermined process. Entropy decoding unit 70 may parse the above noted syntax elements from the bitstream in accordance with the techniques described in this disclosure.

In some examples, entropy decoding unit 70 determines the flag specified in a picture parameter set (PPS) of the bitstream representative of the encoded video data that indicates whether at least one of the above noted offsets used in determining whether to perform de-blocking filtering of the reconstructed block of video data or used in determining de-blocking filtering strength is specified in a header of the slice that included the block of encoded video data. The at least one offset, as noted above, may be associated with a size of the transform applied to encode the block of the encoded video data in the manner described above. Based on the flag, entropy decoding unit 70 may extract the at least one offset from the header of the slice. This flag, as noted above, may refer to the de-blocking_filter_control_present_flag.

In other examples, entropy decoding unit 70 extracts at least one the above noted offsets used in determining whether to perform de-blocking filtering of the reconstructed block of video data or used in determining de-blocking filtering strength from an APS or PPS included within the bitstream representative of the encoded video data. Again, the one or more offsets may be associated with a size of a transform applied to encode the block of the encoded video data. The two aspects of the techniques directed to signaling the flag in the PPS and signaling of the offsets in the APS or PPS may be utilized together or separately. When utilized together, the flag, when set to zero, may indicate that the offsets are signaled in the APS or PPS and may indicate, when set to one, that the offsets are signaled in the slice header. In any event, entropy decoding unit 70 may extract the offsets from the bitstream and provide these offsets to de-blocking unit 63 shown in the example of FIG. 3 (which may be substantially similar to de-blocking unit 63 shown in the example of FIG. 2 in that both may perform substantially the same or similar de-blocking processes to deblock reconstructed blocks of video data).

In some examples, the entropy decoding unit 70 (or the inverse quantization unit 76) may scan the received values using a scan mirroring the scanning mode used by the entropy encoding unit 56 (or the quantization unit 54) of the video encoder 20. Although the scanning of coefficients may be performed in the inverse quantization unit 76, scanning will be described for purposes of illustration as being performed by the entropy decoding unit 70. In addition, although shown as separate functional units for ease of illustration, the structure and functionality of the entropy decoding unit 70, the inverse quantization unit 76, and other units of the video decoder 30 may be highly integrated with one another.

The inverse quantization unit 76 inverse quantizes, i.e., de-quantizes, the quantized transform coefficients provided in the bitstream and decoded by the entropy decoding unit 70. The inverse quantization process may include a conventional process, e.g., similar to the processes proposed for HEVC or defined by the H.264 decoding standard. The inverse quantization process may include use of a quantization parameter QP calculated by the video encoder 20 for the CU to determine a degree of quantization and, likewise, a degree of inverse quantization that should be applied. The quantization parameter may vary, as noted above, based on the size of the transform applied to generate the transform coefficients from the residual video data. The inverse quantization unit 76 may inverse quantize the transform coefficients either before or after the coefficients are converted from a one-dimensional array to a two-dimensional array.

Inverse transform module 78 applies an inverse transform to the inverse quantized transform coefficients. In some examples, inverse transform module 78 may determine an inverse transform based on signaling from video encoder 20, or by inferring the transform from one or more coding characteristics such as block size, coding mode, or the like. In some examples, inverse transform module 78 may determine a transform to apply to the current block based on a signaled transform at the root node of a quadtree for an LCU including the current block. Alternatively, the transform may be signaled at the root of a TU quadtree for a leaf-node CU in the LCU quadtree. In some examples, inverse transform module 78 may apply a cascaded inverse transform, in which inverse transform module 78 applies two or more inverse transforms to the transform coefficients of the current block being decoded. Inverse transform module 78 may generate a block of residual video data.

Intra-prediction unit 74 may generate prediction data for a current block of a current frame based on a signaled intra-prediction mode and data from previously decoded blocks of the current frame.

Based on the retrieved motion prediction direction, reference frame index, and calculated current motion vector (e.g., a motion vector copied from a neighboring block according to a merge mode), motion compensation unit 72 produces a motion compensated block for the current portion. These motion compensated blocks essentially recreate the predictive block used to produce the block of residual data.

Motion compensation unit 72 may produce the motion compensated blocks, possibly performing interpolation based on interpolation filters. Identifiers for interpolation filters to be used for motion estimation with sub-pixel precision may be included in the syntax elements. Motion compensation unit 72 may use interpolation filters as used by video encoder 20 during encoding of the video block to calculate interpolated values for sub-integer pixels of a reference block. Motion compensation unit 72 may determine the interpolation filters used by video encoder 20 according to received syntax information and use the interpolation filters to produce predictive blocks.

Additionally, motion compensation unit 72 and intra-prediction unit 74, in an HEVC example, may use some of the syntax information (e.g., provided by a quadtree) to determine sizes of LCUs used to encode frame(s) of the encoded video sequence. Motion compensation unit 72 and intra-prediction unit 74 may also use syntax information to determine split information that describes how each CU of a frame of the encoded video sequence is split (and likewise, how sub-CUs are split). The syntax information may also include modes indicating how each split is encoded (e.g., intra- or inter-prediction, and for intra-prediction an intra-prediction encoding mode), one or more reference frames (and/or reference lists containing identifiers for the reference frames) for each inter-encoded PU, and other information to decode the encoded video sequence.

Summer 80 combines the residual blocks with the corresponding prediction blocks generated by motion compensation unit 72 or intra-prediction unit 74 to form decoded blocks. Video decoder 30 may also include a de-blocking unit 81, which may apply a de-blocking filter to perform de-blocking filtering in accordance with various aspects of the techniques described above in this disclosure. De-blocking unit 81 of video decoder 30 may be similar to, if not substantially similar to, de-blocking unit 63 of video encoder 20 in that de-blocking unit 81 of video decoder 30 may operate in a manner similar to that described above with respect to de-blocking unit 63 of video encoder 20. In any event, this filter may be applied to filter the decoded blocks in order to remove blockiness artifacts. The decoded video blocks are then stored in the decoded picture buffer 82, which provides reference blocks for subsequent motion compensation and also produces decoded video for presentation on a display device (such as the display device 32 of FIG. 1).

Figure 4:
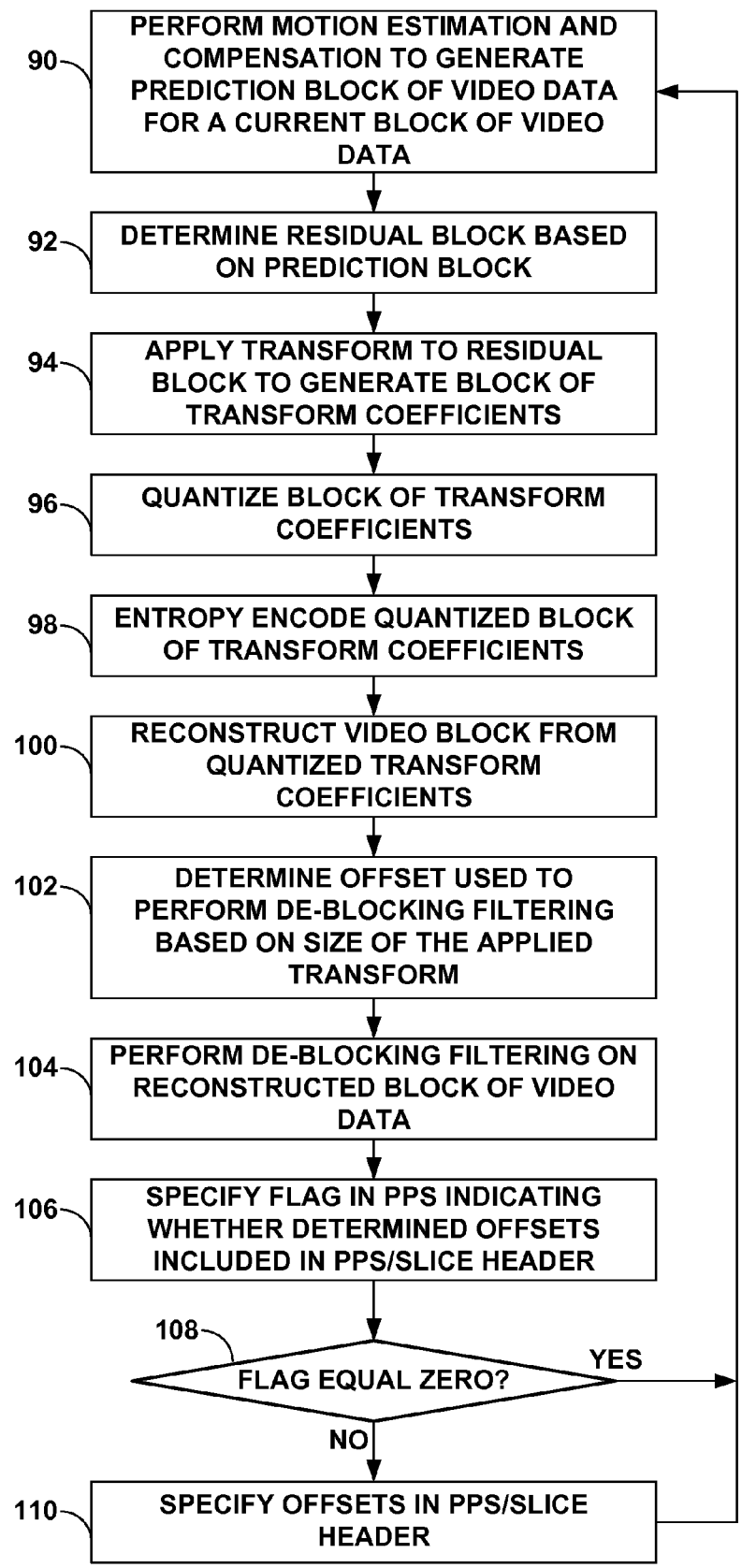
FIG. 4 is a flowchart illustrating exemplary operation of a video encoder in specifying a flag in a picture parameter set (PPS) of a bitstream that indicates whether offsets used to control de-blocking filtering are included in a slice header.

FIG. 4 is a flowchart illustrating exemplary operation of a video encoder, such as video encoder 20 shown in the example of FIG. 2, in specifying a flag in a picture parameter set (PPS) of a bitstream that indicates whether offsets used to control de-blocking filtering are included in a slice header. Initially, video encoder 20 may receive a block of video data. Video encoder 20 may, to encode this block of video data, perform either inter- or intra-coding, which mode select unit 40 may determine whether to inter- or intra-code the block of video data through analysis of the block in the manner described above. The example presented in FIG. 4 assumes that mode select unit 40 selected inter-coding of the current block of video data for illustration purposes. The techniques should not be limited to this example. In any event, motion estimation unit 42 and motion compensation unit 44 perform motion estimation and compensation to generate a predictive block for the current block of video data (90). Summer 50 subtracts the predictive block from the current block of video data to generate a residual block of video data or residual block (92).

Transform module 52 may then apply one or more transforms to the residual block of video data to generate a block of transform coefficients in the manner described above (94). Quantization unit 54 may then quantize the block of transform coefficients, again in the manner described above, to generate a quantized block of transform coefficients (96). As noted above, quantization unit 54 may apply a quantization parameter that varies based on a size of the applied transform to quantize the block of transform coefficients. In any event, after performing quantization, entropy encoding unit 56 may entropy encode the block of transform coefficients, storing the entropy encoded block of transform coefficients in a bitstream representative of the encoded video data (98).

Video encoder 20 may then reconstruct the block of video data from the quantized block of transform coefficients in the manner described above (100). De-blocking unit 63 may then determine whether to perform de-blocking filtering to filter the reconstructed block of video data. De-blocking unit 63 may determine at least one offset used in determining whether to perform de-blocking filtering of the reconstructed block of video data or used in determining de-blocking filtering strength based on the size of the applied transform (102). De-blocking unit 63 may then perform de-blocking filtering on the reconstructed block of video data based on the determined at least one offset (104).

Entropy encoding unit 56 may then specify a flag in a picture parameter set (PPS) that indicates whether the at least one offset is specified as at least one syntax element in a header of an independently decodable unit (e.g., a slice) that includes an encoded version of the block of video data (106). Again, in some instances, this flag may be denoted in syntax tables as a "de-blocking_filter_control_present_flag" syntax element. Entropy encoding unit 56 may determine the value for this flag based on an analysis of the current slice header and the header of previous or subsequent slices, comparing the occurrence and values of similar offsets in these other slice headers to determine whether the offsets may be specified in other parameter sets, such as the APS, PPS or in each slice header separately. Entropy encoding unit 56, as one example, may determine a rate of change of these offsets in the slice headers, compare this determined rate of change to a threshold rate of change, and determine whether the offsets can be specified for two or more slices collectively based on the comparison. While described with respect to this example, the techniques may be implemented with respect to any way by which a video encoder may determine whether to specify syntax elements in a slice header as opposed to in a SPS, PPS, APS or other parameter set or header.

In any event, if this flag is set to or equals zero ("YES" 108), entropy encoding unit 56 does not specify the offsets in the PPS or slice header and the process may be reiterated with respect to another block (if the current block is not the last block of video data; 90-110). Otherwise, if this flag is set to one, meaning the flag does not equal zero ("NO" 108), entropy encoding unit 56 may specify one or more of the above noted offsets in either the PPS and/or the slice header associated with the encoded version of the current block of video data (110). Again, so long as this is not the last block of video data to be encoded, video encoder 20 may continue to perform this process (90-110).

Figure 5:
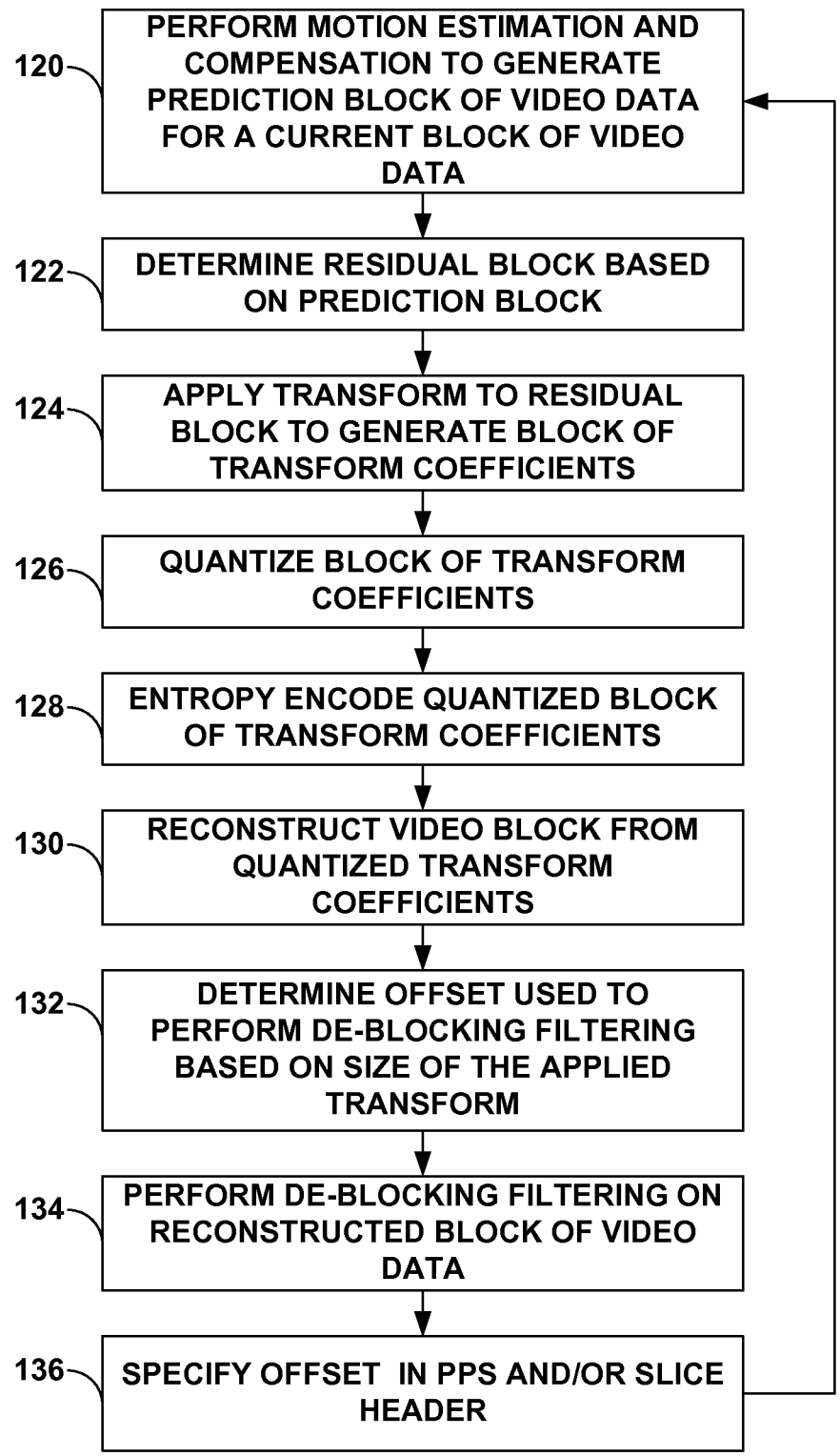
FIG. 5 is a flowchart illustrating exemplary operation of a video encoder in specifying offsets used to control de-blocking filtering in an adaptation parameter set (APS).

FIG. 5 is a flowchart illustrating exemplary operation of a video encoder, such as video encoder 20 shown in the example of FIG. 2, in specifying offsets used to control de-blocking filtering in an adaptations parameter set (APS) or a picture parameter set (PPS). Initially, video encoder 20 may receive a block of video data. Video encoder 20 may, to encode this block of video data, perform either inter- or intra-coding, which mode select unit 40 may determine whether to inter- or intra-code the block of video data through analysis of the block in the manner described above. The example presented in FIG. 4 assumes that mode select unit 40 selected inter-coding of the current block of video data for illustration purposes. The techniques should not be limited to this example. In any event, motion estimation unit 42 and motion compensation unit 44 perform motion estimation and compensation to generate a prediction block of video data for the current block of video data (120). Summer 50 subtracts the predictive block from the current block of video data to determine a residual block of video data or residual block (122).

Transform module 52 may then apply one or more transforms to the residual block of video data to generate a block of transform coefficients in the manner described above (124). Quantization unit 54 may then quantize the block of transform coefficients, again in the manner described above, to generate a quantized block of transform coefficients (126). As noted above, quantization unit 54 may apply a quantization parameter that varies based on a size of the applied transform to quantize the block of transform coefficients. In any event, after performing quantization, entropy encoding unit 56 may entropy encode the block of transform coefficients, storing the entropy encoded block of transform coefficients in a bitstream representative of the encoded video data (128).

Video encoder 20 may then reconstruct the block of video data from the quantized block of transform coefficients in the manner described above (130). De-blocking unit 63 may then determine whether to perform de-blocking filtering to filter the reconstructed block of video data. De-blocking unit 63 may determine at least one offset used in determining whether to perform de-blocking filtering of the reconstructed block of video data or used in determining de-blocking filtering strength based on the size of the applied transform (132). De-blocking unit 63 may then perform de-blocking filtering on the reconstructed block of video data based on the determined at least one offset (134).

Entropy encoding unit 56 may then specify the offsets used to control de-blocking filtering in a PPS and/or slice header in the manner described above (136). Entropy encoding unit 56 may perform an analysis of the current slice header and the header of previous or subsequent slices, comparing the occurrence and values of similar offsets in these other slice headers to determine whether the offsets may be specified in other parameter sets, such as the APS or PPS, or in each slice header separately. Entropy encoding unit 56, as one example, may determine a rate of change of these offsets in the slice headers, compare this determined rate of change to a threshold rate of change, and determine whether the offsets can be specified for two or more slices collectively based on the comparison. While described with respect to this example, the techniques may be implemented with respect to any way by which a video encoder may determine whether to specify syntax elements in a slice header as opposed to in a SPS, PPS, APS or other parameter set or header. As noted above, so long as this is not the last block of video data to be encoded, video encoder 20 may continue to perform this process (120-136).

Figure 6:
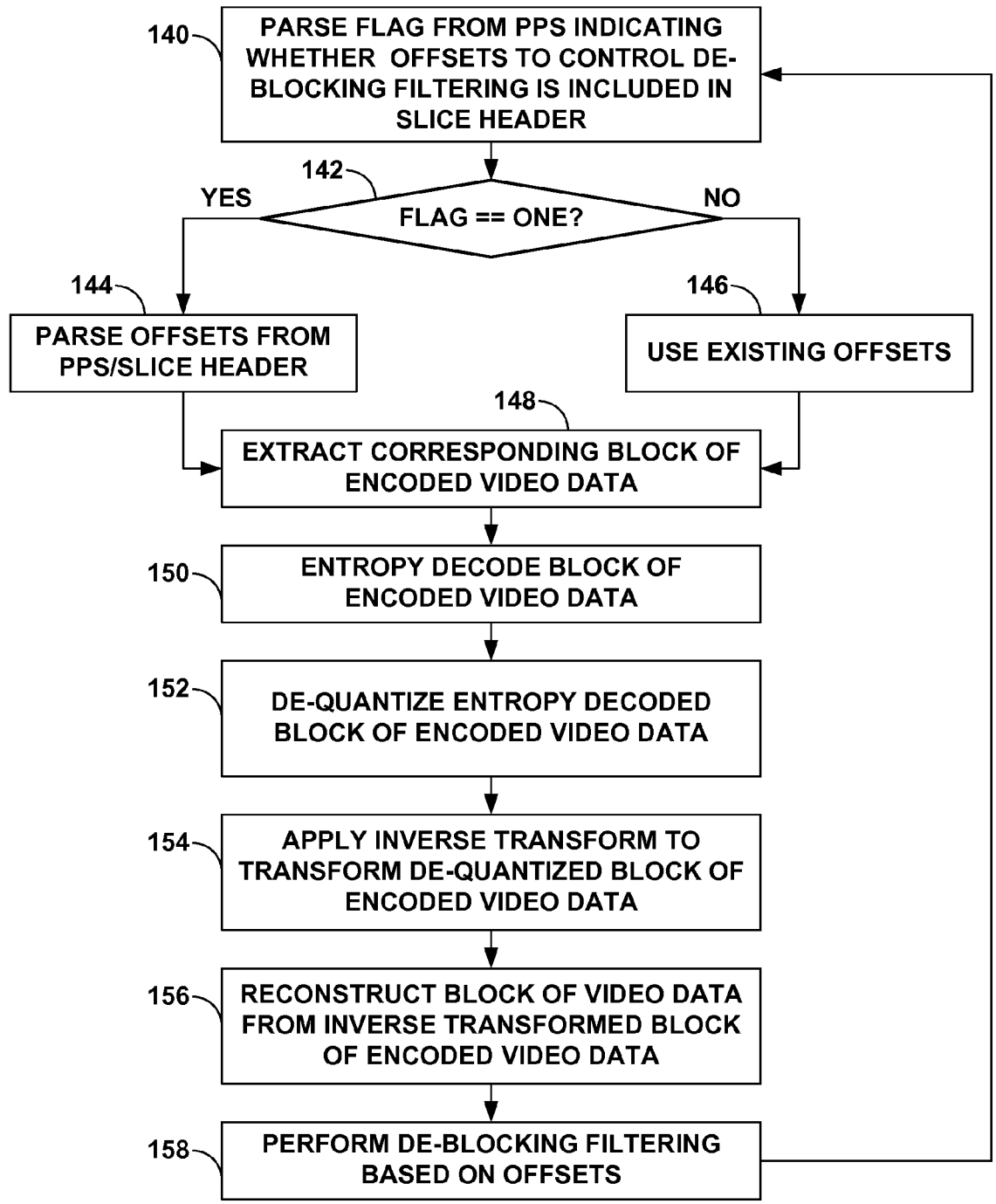
FIG. 6 is a flowchart illustrating exemplary operation of a video decoder in extracting a flag from a picture parameter set (PPS) that indicates whether offsets used to control de-blocking filtering are included in a slice header.

FIG. 6 is a flowchart illustrating exemplary operation of a video decoder, such as video decoder 30 shown in the example of FIG. 3, in extracting a flag from a picture parameter set (PPS) that indicates whether offsets used to control de-blocking filtering are included in a slice header. Initially, entropy decoding unit 70 performs an entropy decoding process on the encoded bitstream to retrieve a one-dimensional array of transform coefficients. Entropy decoding unit 70 may parse the above noted syntax elements from the bitstream in accordance with the techniques described in this disclosure.

In some examples, entropy decoding unit 70 determines or parses the flag specified in a picture parameter set (PPS) of the bitstream representative of the encoded video data that indicates whether at least one of the above noted offsets used in determining whether to perform de-blocking filtering of the reconstructed block of video data or used in determining de-blocking filtering strength is specified in a header of the slice that included the block of encoded video data (140). The at least one offset, as noted above, may be associated with a size of the transform applied to encode the block of the encoded video data in the manner described above. Based on the flag (142), entropy decoding unit 70 may extract the at least one offset from one or both of the PPS and the header of the slice. This flag, as noted above, may refer to the de-blocking_filter_control_present_flag. When the flag is equal to one ("YES" 142), entropy decoding unit 70 may parse or otherwise extract the above noted offsets from either the PPS or a slice header (144).

When the flag is equal to zero ("NO" 142), entropy decoding unit 70 may use existing offsets (146). Again, the one or more offsets may be associated with a size of a transform applied to encode the block of the encoded video data. The two aspects of the techniques directed to signaling the flag in the PPS and signaling of the offsets in the APS or PPS may be utilized together or separately. When utilized together, the flag, when set to zero, may indicate that the offsets are signaled in the APS and may indicate, when set to one, that the offsets are signaled in the slice header. In any event, entropy decoding unit 70 may extract the offsets from the bitstream and provide these offsets to de-blocking unit 81. Entropy decoding unit 70 may also extract the corresponding block of encoded video data and entropy decode the block of encoded video data in the manner described above (148, 150).

In some examples, entropy decoding unit 70 (or inverse quantization unit 76) may scan the received values using a scan mirroring the scanning mode used by entropy encoding unit 56 (or the quantization unit 54) of video encoder 20. Inverse quantization unit 76 inverse quantizes, i.e., de-quantizes, the quantized transform coefficients provided in the bitstream and decoded by the entropy decoding unit 70 (which may be referred to as the entropy decoded block of encoded video data; 152). The inverse quantization process may include use of a quantization parameter QP calculated by the video encoder 20 for the CU to determine a degree of quantization and, likewise, a degree of inverse quantization that should be applied. The quantization parameter may vary, as noted above, based on the size of the transform applied to generate the transform coefficients from the residual video data. The inverse quantization unit 76 may inverse quantize the transform coefficients either before or after the coefficients are converted from a one-dimensional array to a two-dimensional array.

Inverse transform module 78 applies an inverse transform to the de-quantized block of encoded video data (154). In some examples, inverse transform module 78 may determine an inverse transform based on signaling from video encoder 20, or by inferring the transform from one or more coding characteristics such as block size, coding mode, or the like. Inverse transform module 78 may output an inverse transformed block of encoded video data generally referred to as residual video data, which video decoder 30 may use to reconstruct the video data through inter- or intra-coding techniques in the manner described above (156).

De-blocking unit 81 may apply a de-blocking filter based on the offsets to perform de-blocking filtering in accordance with various aspects of the techniques described above in this disclosure (158). De-blocking unit 81 may be similar to, and possibly substantially similar or identical to, de-blocking unit 63 of video encoder 20 in that de-blocking unit 81 may operate in a manner similar to that described above with respect to de-blocking unit 63 of video encoder 20. De-blocking unit 81 may use the offsets extracted by entropy decoding unit 70 to determine whether to perform or otherwise control de-blocking filtering. In any event, this filter may be applied to filter the decoded blocks in order to remove blockiness artifacts. The decoded video blocks are then stored in the decoded picture buffer 82, which provides reference blocks for subsequent motion compensation and also produces decoded video for presentation on a display device (such as the display device 32 of FIG. 1).

Figure 7:
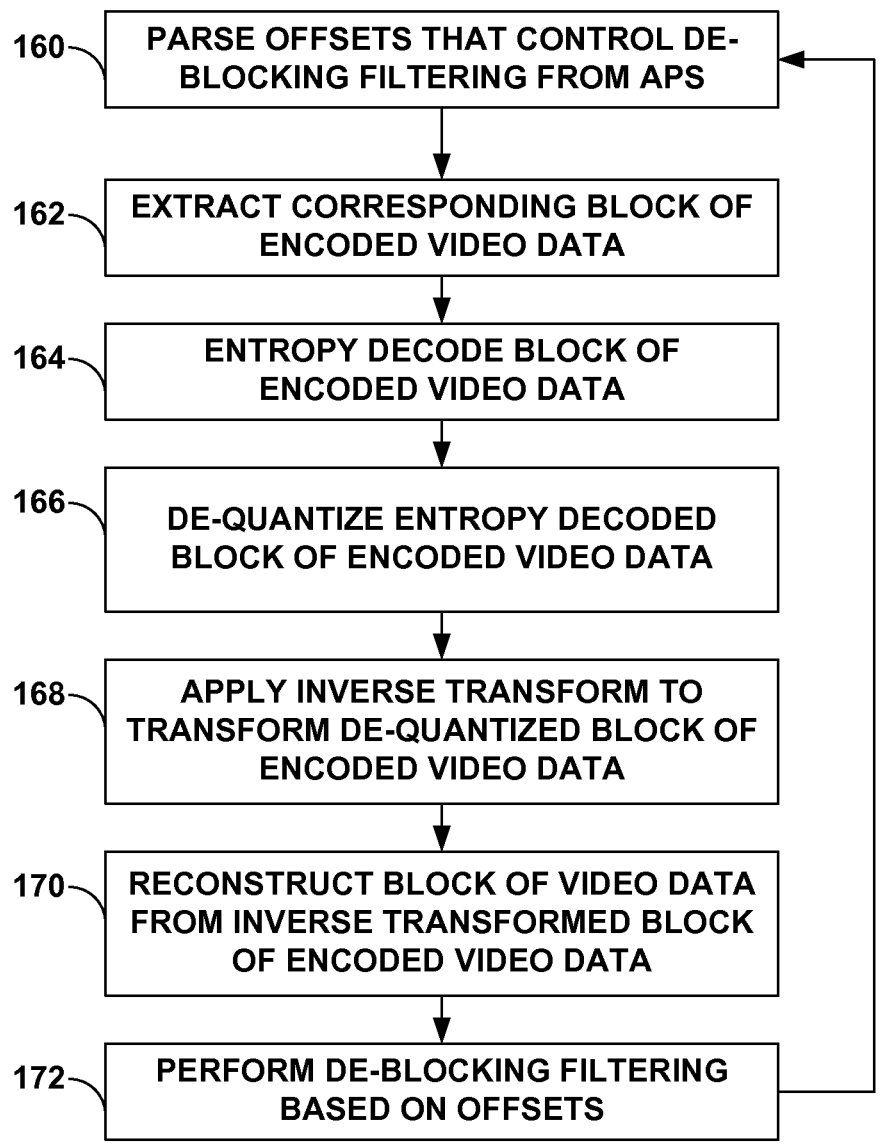
FIG. 7 is a flowchart illustrating exemplary operation of a video decoder in extracting offsets used to control de-blocking filtering from an adaptation parameter set in accordance with the techniques described in this disclosure.

FIG. 7 is a flowchart illustrating exemplary operation of a video decoder, such as video decoder 30 shown in the example of FIG. 3, in extracting offsets used to control de-blocking filtering from an adaptations parameter set in accordance with the techniques described in this disclosure. Initially, entropy decoding unit 70 performs an entropy decoding process on the encoded bitstream to retrieve a one-dimensional array of transform coefficients. Entropy decoding unit 70 may parse the above noted syntax elements from the bitstream in accordance with the techniques described in this disclosure.

In some examples, entropy decoding unit 70 extracts or otherwise parses at least one the above noted offsets used in determining whether to perform de-blocking filtering of the reconstructed block of video data or used in determining de-blocking filtering strength from an APS or PPS included within the bitstream representative of the encoded video data (160). Again, the one or more offsets may be associated with a size of a transform applied to encode the block of the encoded video data. Entropy decoding unit 70 may provide these offsets to de-blocking unit 81. Entropy decoding unit 70 may also extract the corresponding block of encoded video data and entropy decode the block of encoded video data in the manner described above (162, 164).

In some examples, entropy decoding unit 70 (or inverse quantization unit 76) may scan the received values using a scan mirroring the scanning mode used by entropy encoding unit 56 (or the quantization unit 54) of video encoder 20. Inverse quantization unit 76 inverse quantizes, i.e., de-quantizes, the quantized transform coefficients provided in the bitstream and decoded by the entropy decoding unit 70 (which may be referred to as the entropy decoded block of encoded video data; 166). The inverse quantization process may include use of a quantization parameter QP calculated by the video encoder 20 for the CU to determine a degree of quantization and, likewise, a degree of inverse quantization that should be applied. The quantization parameter may vary, as noted above, based on the size of the transform applied to generate the transform coefficients from the residual video data. The inverse quantization unit 76 may inverse quantize the transform coefficients either before or after the coefficients are converted from a one-dimensional array to a two-dimensional array.

Inverse transform module 78 applies an inverse transform to the de-quantized block of encoded video data (168). In some examples, inverse transform module 78 may determine an inverse transform based on signaling from video encoder 20, or by inferring the transform from one or more coding characteristics such as block size, coding mode, or the like. Inverse transform module 78 may output an inverse transformed block of encoded video data generally referred to as residual video data, which video decoder 30 may use to reconstruct the video data through inter- or intra-coding techniques in the manner described above (170).

De-blocking unit 81 may apply a de-blocking filter based on the offsets to perform de-blocking filtering in accordance with various aspects of the techniques described above in this disclosure (172). De-blocking unit 81 may be similar to, if not substantially similar to, de-blocking unit 63 of video encoder 20 in that de-blocking unit 81 may operate in a manner similar to that described above with respect to de-blocking unit 63 of video encoder 20. De-blocking unit 81 may use the offsets extracted by entropy decoding unit 70 to determine whether to perform or otherwise control de-blocking filtering. In any event, this filter may be applied to filter the decoded blocks in order to remove blockiness artifacts. The decoded video blocks are then stored in the decoded picture buffer 82, which provides reference blocks for subsequent motion compensation and also produces decoded video for presentation on a display device (such as the display device 32 of FIG. 1).

Figure 8:
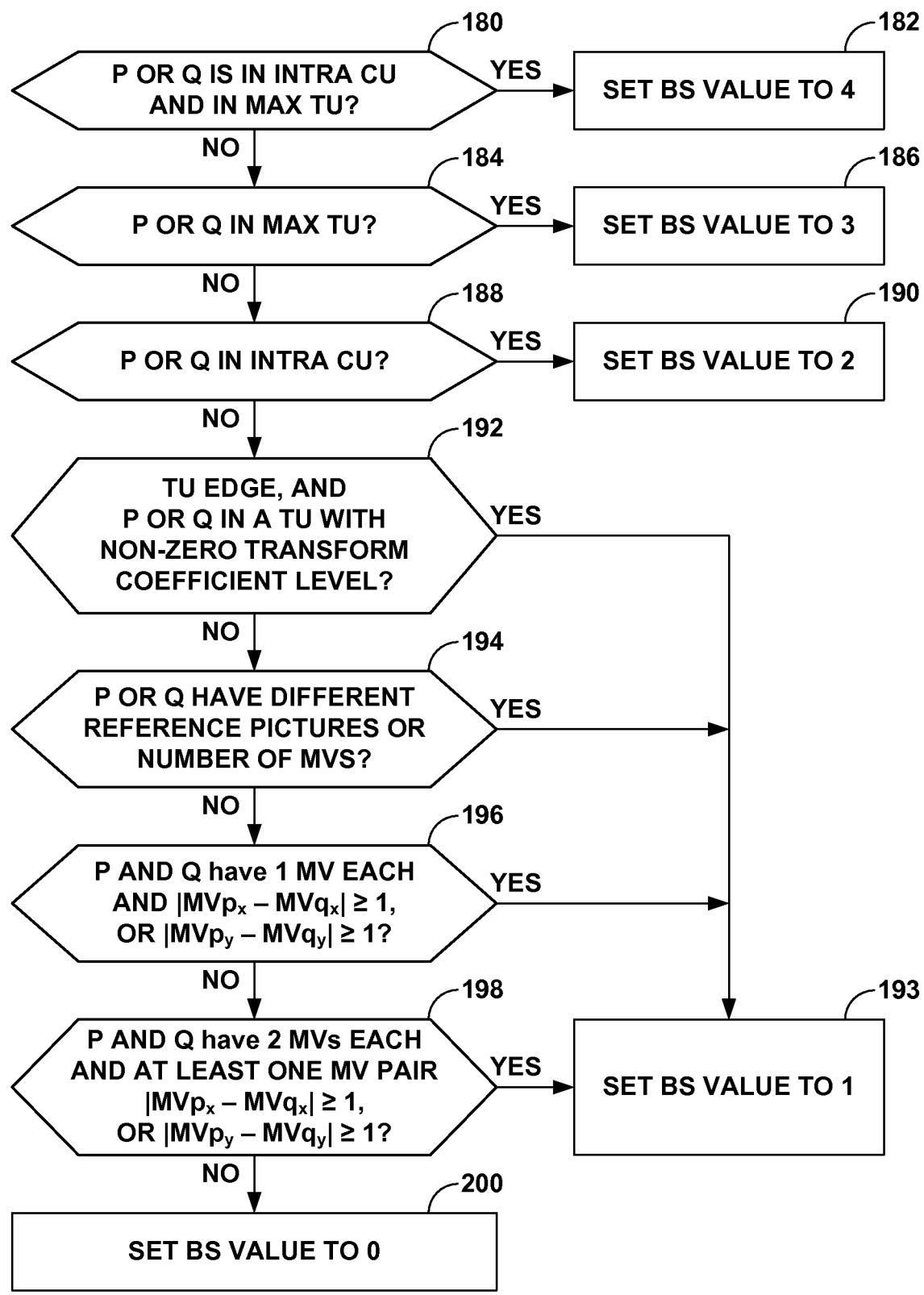
FIG. 8 is a flowchart illustrating exemplary operation of a video coder in implementing various aspects of the techniques for determining a boundary strength value used to compute deblocking filter parameters.

FIG. 8 is a flowchart illustrating exemplary operation of a video coder, such as video encoder 20 shown in the examples of FIGS. 1 and 2 and/or video decoder 30 shown in the examples of FIGS. 1 and 3, in implementing various aspects of the techniques for determining a boundary strength value used to compute deblocking filter parameters. The steps of this flowchart generally reflect the above pseudo-code, which is reproduced again below for purposes of review in view of the flowchart set forth in the example of FIG. 8.

IF (P has MODE_INTRA and P is included in maximum TB size) or (Q has MODE_INTRA and Q is included in maximum TB size) THEN Bs=4,
ELSE IF (P is included in maximum TB size) or (Q is included in maximum TB size) THEN Bs=3, ELSE IF (P or Q have MODE_INTRA) THEN Bs=2,
ELSE further Bs derivation follows HEVC specification.

In the example of FIG. 8, the video coder may first determine whether the P or Q block is in an intra-coded CU and in a TU of maximum size (max TU) (180). If either of the P or Q blocks is in an intra-coded CU and in a max TU ("YES" 180), the video coder may set the boundary strength value to four (182). If either of the P or Q blocks is either not in an intra-coded CU and/or not in a max TU ("NO" 180), the video coder may determine whether the P or Q blocks are in a max TU (184). If either of the P or Q blocks are in a max TU ("YES" 184), the video coder may set the Bs value to three (186). However, if both the P and Q blocks are not in a max TU ("NO" 184), the video coder may determine whether the P or Q blocks are in an intra-coded CU (188).

If either of the P or Q blocks are in an intra-coded CU ("YES" 188), the video coder may set the Bs value to two (190). However, if both the P and Q blocks are not in an intra-coded CU ("NO" 188), the video coder may then determine whether there is a transform unit (TU) edge and whether the P or Q blocks are in a TU with a non-zero transform coefficient level (192). If the video coder determines that there is a TU edge and that either of the P or Q blocks are in a TU with a non-zero transform coefficient level ("YES" 192), the video coder may set the Bs value to one (193).

However, if the video coder determines that there is not a TU edge and/or that both of the P and Q blocks are not in a TU with a non-zero transform coefficient level ("NO" 192), the video coder may determine whether the P or Q blocks have different reference pictures or number of motion vectors (MVs) (194). If the video coder determines that the P or Q blocks have different reference pictures and/or a number of MVs ("YES" 194), the video decoder sets Bs to one (193).

However, if the video coder determines either that the P or Q blocks have the same reference pictures (or do not have different reference pictures) or a number of MVs (or do not have a different number of MVs) ("NO" 194), the video decoder determines whether the P and Q blocks have one MV each and at least one MV pair that satisfies the following conditions: 1) the absolute value of the x-component of the motion vector for the P block ($MVp_x$) subtracted by the x-component of the motion vector for the Q block ($MVq_x$) is greater than or equal to one ($|MVp_x - MVq_x| \geq 1$); or 2) the absolute value of the y-component of the motion vector for the P block ($MVp_y$) subtracted by the y-component of the motion vector for the Q block ($MVq_y$) is greater than or equal to one ($|MVp_y - MVq_y| \geq 1$) (196). If either of these conditions is satisfied ("YES" 196), the video coder sets the Bs value to one (193).

However, if none of these conditions are satisfied ("NO" 196), the video coder determines whether the P and Q blocks have two MVs each and at least one MV pair that satisfies the following conditions: 1) the absolute value of the x-component of one of the motion vectors for the P block ($MVp_x$) subtracted by the x-component of one of the motion vectors for the Q block ($MVq_x$) is greater than or equal to one ($|MVp_x - MVq_x| \geq 1$); or 2) the absolute value of the y-component of one of the motion vectors for the P block ($MVp_y$) subtracted by the y-component of one of the motion vectors for the Q block ($MVq_y$) is greater than or equal to one ($|MVp_y - MVq_y| \geq 1$) (198). If either of these conditions is satisfied ("YES" 198), the video coder sets the Bs value to one (193). However, if neither of these conditions are satisfied ("NO" 198), the video coder sets the Bs value to zero (200). As described above, the video coder may use the Bs value when computing deblocking filter parameters.

While various examples have been described above, the techniques should not be limited to specific combinations of the various aspects of the techniques described in this disclosure. Instead, the various aspects or elements of the techniques may be implemented in any feasible combination.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method of encoding video data, the method comprising:
applying a transform to a block of the video data to generate a block of transform coefficients;
applying a quantization parameter to quantize the block of transform coefficients;
generating an encoded version of the block of video data for a video bitstream based on the quantized block of transform coefficients;
reconstructing the block of video data from the quantized block of transform coefficients;
determining at least one offset used for one or both of determining whether to perform de-blocking filtering of the reconstructed block of video data or used in determining de-blocking filtering strength, wherein the at least one offset comprises one or more of a $t_c$ offset and a $\beta$ offset, wherein the $t_c$ offset comprises an offset used for one or both of determining whether to perform de-blocking filtering or determining de-blocking filtering strength for both luma and chroma aspects of the reconstructed block of video data, and wherein the $\beta$ offset comprises an offset used for one or both of determining whether to perform de-blocking filtering or determining de-blocking filtering strength for luma aspects of the reconstructed block of video data
performing de-blocking filtering on the reconstructed block of video data based on the determined at least one offset;
specifying a flag in a picture parameter set (PPS) of the video bitstream that indicates whether the at least one offset is specified as at least one syntax element in one or both of the PPS and a header of an independently decodable unit that includes the encoded version of the block of video data; and
specifying the at least one offset as at least one syntax element in one or both of the PPS and the header of the independently decodable unit that includes the encoded version of the block of video data.

2. The method of claim 1, wherein the flag comprises a de-blocking_filter_control_present flag.

3. The method of claim 1, wherein determining at least one offset comprises:
determining whether a size of the transform applied to the block of video data is a maximum transform unit size; and
upon determining that a size of the transform applied to the block of video data is the maximum transform unit size, determining one or more of a maximum $t_c$ offset and a maximum $\beta$ offset that are used in place of the $t_c$ offset and the $\beta$ offset that are otherwise used for determining whether to perform the de-blocking of the reconstructed block of the video data when the size of the transform applied to the block of video data is not a maximum transform unit size.

4. The method of claim 3, further comprising specifying the maximum $t_c$ offset and the maximum $\beta$ offset in one or both of a picture parameter set (PPS) and a header of the independently decodable unit.

5. The method of claim 3, further comprising specifying a de-blocking_max_tu_offset_enabled_flag in one or both of a picture parameter set (PPS) and a header of the independently decodable unit that indicates whether or not the maximum $t_c$ offset and the maximum $\beta$ offset are specified in the PPS or the header of the independently decodable unit, respectively.

6. The method of claim 1, further comprising determining a boundary strength value for the reconstructed block of video data,
wherein determining at least one offset comprises determining the at least one offset used for one or both of determining whether to perform the de-blocking filtering of the reconstructed block of video data or determining the de-blocking filtering strength based on the determined boundary strength value.

7. The method of claim 1, further comprising determining a boundary strength value for the reconstructed block of video data based on whether the block of video data or a block adjacent to the block of video data is included in an intra-coded coding unit and whether the block of video data or the block adjacent to the block of video data is included in a transform unit of maximum size, and
wherein determining at least one offset comprises determining the at least one offset used for one or both of determining whether to perform the de-blocking filtering of the reconstructed block of video data or determining the de-blocking filtering strength based on the determined boundary strength.

8. The method of claim 1, further comprising determining a boundary strength value for the reconstructed block of video data based on whether the block of video data is included in an intra-coded coding unit and is included in a transform unit of maximum size or whether a block adjacent to the block of video data is included in an intra-coded coding unit and is included in a transform unit of maximum size; and
wherein determining at least one offset comprises determining the at least one offset used for one or both of determining whether to perform the de-blocking filtering of the reconstructed block of video data or determining the de-blocking filtering strength based on the determined boundary strength.

9. The method of claim 1, further comprising determining a boundary strength value for the reconstructed block of video data when neither the block of video data nor a block adjacent to the block of video data are included in an intra-coded coding unit and at least one of the block of video data and the block adjacent to the block of video data is include in a transform unit of maximum size, and
wherein determining at least one offset comprises determining the at least one offset used for one or both of determining whether to perform the de-blocking filtering of the reconstructed block of video data or used in determining the de-blocking filtering strength based on the determined boundary strength.

10. The method of claim 1, further comprising determining a boundary strength value for the reconstructed block of video data when at least one of the block of video data and a block adjacent to the block of video data is included in a transform unit of maximum size without determining whether the block of video data and the block adjacent to the block of video data is included within an intra-coded coding unit; and
wherein determining at least one offset comprises determining the at least one offset used for one or both of determining whether to perform the de-blocking filtering of the reconstructed block of video data or used in determining the de-blocking filtering strength based on the determined boundary strength.

11. The method of claim 1, wherein determining at least one offset comprises determining the at least one offset used for one or both of determining whether to perform the de-blocking filtering of the reconstructed block of video data or determining the de-blocking filtering strength based on whether the block of video data was intra-coded or inter-coded.

12. The method of claim 11, further comprising:
specifying a flag in a picture parameter set (PPS) to indicate that the at least one offset is specified as at least one syntax element in one or both of the PPS and a header of the independently decodable unit that includes an encoded version of the block of video data, and
specifying the at least one offset determined based on whether the block of video data was intra-coded or inter-coded as the at least one syntax element in one or both of the PPS and the header of the independently decodable unit that includes the encoded version of the block of video data.

13. The method of claim 1, further comprising:
specifying a flag in a picture parameter set (PPS) to indicate that the at least one offset is not specified as the at least one syntax element in one or both of the PPS and a header of the independently decodable unit that includes an encoded version of the block of video data; and
specifying the at least one offset as a syntax element in the PPS.

14. A video encoding device configured to encode video data comprising:
a memory configured to store the video data; and
one or more processors configured to:
apply a transform to a block of the video data to generate a block of transform coefficients,
apply a quantization parameter to quantize the block of transform coefficients,
generate an encoded version of the block of video data for a video bitstream based on the quantized block of transform coefficients,
reconstruct the block of video data from the quantized block of transform coefficients;
determine at least one offset used in determining whether to perform de-blocking filtering of the reconstructed block of video data or used in determining de-blocking filtering strength, wherein the at least one offset comprises one or more of a $t_c$ offset and a β offset, wherein the $t_c$ offset comprises an offset used for one or both of determining whether to perform de-blocking filtering or determining de-blocking filtering strength for both luma and chroma aspects of the reconstructed block of video data, and wherein the β offset comprises an offset used for one or both of determining whether to perform de-blocking filtering or determining de-blocking filtering strength for luma aspects of the reconstructed block of video data;
perform de-blocking filtering on the reconstructed block of video data based on the determined at least one offset;
specify a flag in a picture parameter set (PPS) of the video bitstream that indicates whether the at least one offset is specified as at least one syntax element in one or both of the PPS and a header of an independently decodable unit that includes the encoded version of the block of video data; and specify the at least one offset as at least one syntax element in one or both of the PPS and the header of the independently decodable unit that includes the encoded version of the block of video data.

15. The video encoding device of claim 14, wherein the flag comprises a de-blocking_filter_control_present flag.

16. The video encoding device of claim 14, wherein the one or more processors are further configured to determine whether a size of the transform applied to the block of video data is a maximum transform unit size and, upon determining that a size of the transform applied to the block of video data is the maximum transform unit size, determining one or more of a maximum $t_c$ offset and a maximum β offset that are used in place of the $t_c$ offset and the β offset that are otherwise used for determining whether to perform the de-blocking of the reconstructed block of the video data when the size of the transform applied to the block of video data is not a maximum transform unit size.

17. The video encoding device of claim 16, wherein the one or more processors are further configured to specify the maximum $t_c$ offset and the maximum β offset in one or both of a picture parameter set (PPS) and a header of the independently decodable unit.

18. The video encoding device of claim 16, wherein the one or more processors are further configured to specify a de-blocking_max_tu_offset_enabled_flag in one or both of a picture parameter set (PPS) and a header of the independently decodable unit that indicates whether or not the maximum $t_c$ offset and the maximum β offset are specified in the PPS or the header of the independently decodable unit, respectively.

19. The video encoding device of claim 14, wherein the one or more processors are further configured to determine a boundary strength value for the reconstructed block of video data and determine the at least one offset used for one or both of determining whether to perform the de-blocking filtering of the reconstructed block of video data or determining the de-blocking filtering strength based on the determined boundary strength value.

20. The video encoding device of claim 14, wherein the one or more processors are further configured to determine a boundary strength value for the reconstructed block of video data based on whether the block of video data or a block adjacent to the block of video data is included in an intra-coded coding unit and whether the block of video data or the block adjacent to the block of video data is included in a transform unit of maximum size, and determine the at least one offset used for one or both of determining whether to perform the de-blocking filtering of the reconstructed block of video data or determining the de-blocking filtering strength based on the determined boundary strength.

21. The video encoding device of claim 14, wherein the one or more processors are further configured to determine a boundary strength value for the reconstructed block of video data based on whether the block of video data is included in an intra-coded coding unit and is included in a transform unit of maximum size or whether a block adjacent to the block of video data is included in an intra-coded coding unit and is included in a transform unit of maximum size, and determine the at least one offset used for one or both of determining whether to perform the de-blocking filtering of the reconstructed block of video data or determining the de-blocking filtering strength based on the determined boundary strength.

22. The video encoding device of claim 14, wherein the one or more processors are further configured to determine a boundary strength value for the reconstructed block of video data when neither the block of video data nor a block adjacent to the block of video data are included in an intra-coded coding unit and at least one of the block of video data and the block adjacent to the block of video data is include in a transform unit of maximum size, and determine the at least one offset used for one or both of determining whether to perform the de-blocking filtering of the reconstructed block of video data or determining the de-blocking filtering strength based on the determined boundary strength.

23. The video encoding device of claim 14, wherein the one or more processors are further configured to determine a boundary strength value for the reconstructed block of video data when at least one of the block of video data and a block adjacent to the block of video data is include in a transform unit of maximum size without determining whether the block of video data and the block adjacent to the block of video data is included within an intra-coded coding unit and determine the at least one offset used for one or both of determining whether to perform the de-blocking filtering of the reconstructed block of video data or used in determining the de-blocking filtering strength based on the determined boundary strength.

24. The video encoding device of claim 14, wherein the one or more processor are further configured to determine the at least one offset used for one or both of determining whether to perform the de-blocking filtering of the reconstructed block of video data or determining the de-blocking filtering strength based on whether the block of video data was intra-coded or inter-coded.

25. The video encoding device of claim 24, wherein the one or more processor are further configured to specify a flag in a picture parameter set (PPS) to indicate that the at least one offset is specified as at least one syntax element in one or both of the PPS and a header of the independently decodable unit that includes an encoded version of the block of video data, and specify the at least one offset determined based both on a size of the applied transform and whether the block of video data was intra-coded or inter-coded as the at least one syntax element in one or both of the PPS and the header of the independently decodable unit that includes the encoded version of the block of video data.

26. The video encoding device of claim 14, wherein the one or more processors are further configured to specify a flag in a picture parameter set (PPS) to indicate that the at least one offset is not specified as at least one syntax element in one or both of the PPS and a header of the independently decodable unit that includes an encoded version of the block of video data, and specify the at least one offset as a syntax element in the PPS.

27. The video encoding device of claim 14, wherein the one or more processors are further configured to apply a quantization parameter that varies based on a size of the transform to quantize the block of transform coefficients.

28. A video encoding device configured to encode video data comprising:
means for applying a transform to a block of the video data to generate a block of transform coefficients;
means for applying a quantization parameter to quantize the block of transform coefficients;
means for generating an encoded version of the block of video data for a video bitstream based on the quantized block of transform coefficients;
means for reconstructing the block of video data from the quantized block of transform coefficients;
means for determining at least one offset used in determining whether to perform de-blocking filtering of the reconstructed block of video data or used in determining de-blocking filtering strength, wherein the at least one offset comprises one or more of a $t_c$ offset and a $\beta$ offset, wherein the $t_c$ offset comprises an offset used for one or both of determining whether to perform de-blocking filtering or determining de-blocking filtering strength for both luma and chroma aspects of the reconstructed block of video data, and wherein the $\beta$ offset comprises an offset used for one or both of determining whether to perform de-blocking filtering or determining de-blocking filtering strength for luma aspects of the reconstructed block of video data;
means for performing de-blocking filtering on the reconstructed block of video data based on the determined at least one offset;
means for specifying a flag in a picture parameter set (PPS) of the video bitstream that indicates whether the at least one offset is specified as at least one syntax element in one or both of the PPS and a header of an independently decodable unit that includes the encoded version of the block of video data; and
means for specifying the at least one offset as at least one syntax element in one or both of the PPS and the header of the independently decodable unit that includes the encoded version of the block of video data.

29. The video encoding device of claim 28, wherein the flag comprises a de-blocking_filter_control_present_flag.

30. A non-transitory computer-readable storage medium having stored thereon instructions that, when executed, cause one or more processors to:
apply a transform to a block of the video data to generate a block of transform coefficients;
apply a quantization parameter to quantize the block of transform coefficients;
generate an encoded version of the block of video data for a video bitstream based on the quantized block of transform coefficients;
reconstruct the block of video data from the quantized block of transform coefficients;
determine at least one offset used in determining whether to perform de-blocking filtering of the reconstructed block of video data or used in determining de-blocking filtering strength, wherein the at least one offset comprises one or more of a $t_c$ offset and a $\beta$ offset, wherein the $t_c$ offset comprises an offset used for one or both of determining whether to perform de-blocking filtering or determining de-blocking filtering strength for both luma and chroma aspects of the reconstructed block of video data, and wherein the $\beta$ offset comprises an offset used for one or both of determining whether to perform de-blocking filtering or determining de-blocking filtering strength for luma aspects of the reconstructed block of video data;
perform de-blocking filtering on the reconstructed block of video data based on the determined at least one offset;
specify a flag in a picture parameter set (PPS) of the video bitstream that indicates whether the at least one offset is specified as at least one syntax element in one or both of the PPS and a header of an independently decodable unit that includes the encoded version of the block of video data; and
specify the at least one offset as at least one syntax element in one or both of the PPS and the header of the independently decodable unit that includes the encoded version of the block of video data.

31. The non-transitory computer-readable storage medium of claim 30, wherein the flag comprises a de-blocking_filter_control_present_flag.

32. The non-transitory computer-readable storage medium of claim 30, wherein the instructions, when executed, further cause the one or more processors, when determining at least one offset, to:
  determine whether a size of the transform applied to the block of video data is a maximum transform unit size; and
  upon determining that a size of the transform applied to the block of video data is the maximum transform unit size, determine one or more of a maximum $t_c$ offset and a maximum β offset that are used in place of the $t_c$ offset and the β offset that are otherwise used in determining whether to perform the de-blocking of the reconstructed block of the video data when the size of the transform applied to the block of video data is not a maximum transform unit size.

33. The non-transitory computer-readable storage medium of claim 32, wherein the instructions, when executed, further cause the one or more processors to specify the maximum $t_c$ offset and the maximum β offset in one or both of a picture parameter set (PPS) and a header of the independently decodable unit.

34. The non-transitory computer-readable storage medium of claim 32, wherein the instructions, when executed, further cause the one or more processors to specify a de-blocking_max_tu_offset_enabled_flag in one or both of a picture parameter set (PPS) and a header of the independently decodable unit that indicates whether or not the maximum $t_c$ offset and the maximum β offset are specified in the PPS or the header of the independently decodable unit, respectively.

35. The non-transitory computer-readable storage medium of claim 30, wherein the instructions, when executed, further cause the one or more processors to:
  determine a boundary strength value for the reconstructed block of video data; and
  when determining the at least one offset, determine the at least one offset used for one or both of determining whether to perform the de-blocking filtering of the reconstructed block of video data or used determining the de-blocking filtering strength based on the determined boundary strength value.

36. The non-transitory computer-readable storage medium of claim 30, wherein the instructions, when executed, further cause the one or more processors to:
  determine a boundary strength value for the reconstructed block of video data based on whether the block of video data or a block adjacent to the block of video data is included in an intra-coded coding unit and whether the block of video data or the block adjacent to the block of video data is included in a transform unit of maximum size; and
  when determining at least one offset, determine the at least one offset used for one or both of determining whether to perform the de-blocking filtering of the reconstructed block of video data or determining the de-blocking filtering strength based on the determined boundary strength.

37. The non-transitory computer-readable storage medium of claim 30, wherein the instructions, when executed, further cause the one or more processors to:
  determine a boundary strength value for the reconstructed block of video data based on whether the block of video data is included in an intra-coded coding unit and is included in a transform unit of maximum size or whether a block adjacent to the block of video data is included in an intra-coded coding unit and is included in a transform unit of maximum size; and
  when determining the at least one offset, determine the at least one offset used for one or both of determining whether to perform the de-blocking filtering of the reconstructed block of video data or determining the de-blocking filtering strength based on the determined boundary strength.

38. The non-transitory computer-readable storage medium of claim 30, wherein the instructions, when executed, further cause the one or more processors to:
  determine a boundary strength value for the reconstructed block of video data when neither the block of video data nor a block adjacent to the block of video data are included in an intra-coded coding unit and at least one of the block of video data and the block adjacent to the block of video data is include in a transform unit of maximum size; and
  when determining the at least one offset, determine the at least one offset used for one or both of determining whether to perform the de-blocking filtering of the reconstructed block of video data or determining the de-blocking filtering strength based on the determined boundary strength.

39. The non-transitory computer-readable storage medium of claim 30, wherein the instructions, when executed, further cause the one or more processors to:
  determine a boundary strength value for the reconstructed block of video data when at least one of the block of video data and a block adjacent to the block of video data is include in a transform unit of maximum size without determining whether the block of video data and the block adjacent to the block of video data is included within an intra-coded coding unit; and
  when determining the at least one offset, determine the at least one offset used for one or both of determining whether to perform the de-blocking filtering of the reconstructed block of video data or used in determining the de-blocking filtering strength based on the determined boundary strength.

40. The non-transitory computer-readable storage medium of claim 30, wherein the instructions, when executed, further cause the one or more processors to, when determining the at least one offset, determine the at least one offset used for one or both of determining whether to perform the de-blocking filtering of the reconstructed block of video data or determining the de-blocking filtering strength based on whether the block of video data was intra-coded or inter-coded.

41. The non-transitory computer-readable storage medium of claim 40, wherein the instructions, when executed, further cause the one or more processors to:
  specify a flag in a picture parameter set (PPS) to indicate that the at least one offset is specified as at least one syntax element in one or both of the PPS and a header of the independently decodable unit that includes an encoded version of the block of video data; and
  specify the at least one offset determined based both on a size of the applied transform and whether the block of video data was intra-coded or inter-coded as the at least one syntax element in one or both of the PPS and the header of the independently decodable unit that includes the encoded version of the block of video data.

42. The non-transitory computer-readable storage medium of claim 30, wherein the instructions, when executed, further cause the one or more processors to:
  specify a flag in a picture parameter set (PPS) to indicate that the at least one offset is not specified as the at least one syntax element in one or both of the PPS and a header of the independently decodable unit that includes an encoded version of the block of video data; and specify the at least one offset as a syntax element in the PPS.

43. The non-transitory computer-readable storage medium of claim 30, wherein the instructions, when executed, further cause the one or more processors to, when applying the quantization parameter, apply a quantization parameter that varies based on a size of the transform to quantize the block of transform coefficients.

44. A method of decoding encoded video data with a video decoder comprising:

applying an inverse quantization parameter to a block of the encoded video data to de-quantize the block of the encoded video data in a video bitstream;

applying the inverse transform to the de-quantized block of the encoded video data to generate a block of residual video data;

reconstructing a block of video data from the block of residual video data;

determining a flag specified in a picture parameter set (PPS) of the encoded video data in the video bitstream that indicates whether at least one offset used in determining whether to perform de-blocking filtering of the reconstructed block of video data or used in determining de-blocking filtering strength is specified in one or both of the PPS and a header of an independently decodable unit that included the block of encoded video data;

based on the flag, extracting the at least one offset from one or both of the PPS and the header of the independently decodable unit, wherein the at least one offset comprises one or more of a $t_c$ offset and a β offset, wherein the $t_c$ offset comprises an offset used for one or both of determining whether to perform de-blocking filtering or determining de-blocking filtering strength for both luma and chroma aspects of the reconstructed block of video data, and wherein the β offset comprises an offset used for one or both of determining whether to perform de-blocking filtering or determining de-blocking filtering strength for luma aspects of the reconstructed block of video data; and performing de-blocking filtering on the reconstructed block of video data based on the at least one offset.

45. The method of claim 44, wherein the flag comprises a de-blocking_filter_control_present_flag.

46. The method of claim 44, wherein the at least one offset comprises at least one offset used in determining whether to perform de-blocking filtering of the reconstructed block of video data or used in determining de-blocking filtering strength that is associated with whether the block of the encoded video data was intra-coded or inter-coded.

47. The method of claim 44, wherein determining the at least one offset comprises extracting, from one or both of a picture parameter set (PPS) and a header of the independently decodable unit that includes the encoded version of the block of video data, a maximum $t_c$ offset and a maximum β offset that are used in place of the $t_c$ offset and the β offset that are otherwise used in determining whether to perform the de-blocking of the reconstructed block of the video data when a size of the transform applied to the block of video data is not a maximum transform unit size.

48. The method of claim 47, wherein extracting a maximum $t_c$ offset and a maximum β offset comprises extracting the maximum $t_c$ offset and the maximum β offset based on a de-blocking_max_tu_offset_enabled_flag specified in one or both of the PPS and the header of the independently decodable unit.

49. The method of claim 44, wherein applying the inverse quantization parameter comprises applying an inverse quantization parameter that varies based on a size of the inverse transform to de-quantize the block of encoded video data.

50. A video decoding device configured to decoding encoded video data comprising:

a memory configured to store the encoded video data; and one or more processors configured to:

apply an inverse quantization parameter to a block of the encoded video data to de-quantize the block of the encoded video data in a video bitstream;

apply the inverse transform to the de-quantized block of the encoded video data to generate a block of residual video data;

reconstruct a block of video data from the block of residual video data;

determine a flag specified in a picture parameter set (PPS) of the encoded video data in the video bitstream that indicates whether at least one offset used in determining whether to perform de-blocking filtering of the reconstructed block of video data or used in determining de-blocking filtering strength is specified in one or both of the PPS and a header of an independently decodable unit that included the block of encoded video data;

extract, based on the flag, the at least one offset from one or both of the PPS and the header of the independently decodable unit, wherein the at least one offset comprises one or more of a $t_c$ offset and a β offset, wherein the $t_c$ offset comprises an offset used for one or both of determining whether to perform de-blocking filtering or determining de-blocking filtering strength for both luma and chroma aspects of the reconstructed block of video data, and wherein the β offset comprises an offset used for one or both of determining whether to perform de-blocking filtering or determining de-blocking filtering strength for luma aspects of the reconstructed block of video data and perform de-blocking filtering on the reconstructed block of video data based on the determined at least one offset.

51. The video decoding device of claim 50, wherein the flag comprises a de-blocking_filter_control_present_flag.

52. The video decoding device of claim 50, wherein the at least one offset comprises at least one offset used for one or both determining whether to perform the de-blocking filtering of the reconstructed block of video data or determining de-blocking filtering strength that is associated with whether the block of the encoded video data was intra-coded or inter-coded.

53. The video decoding device of claim 50, wherein the one or more processors, when determining the at least one offset, are further configured to extract, from one or both of a picture parameter set (PPS) and a header of the independently decodable unit that includes the encoded version of the block of video data, a maximum $t_c$ offset and a maximum β offset that are used in place of the $t_c$ offset and the β offset that are otherwise used for determining whether to perform the de-blocking of the reconstructed block of the video data when a size of the transform applied to the block of video data is not a maximum transform unit size.

54. The video decoding device of claim 53, wherein the one or more processors are further configured to extract the maximum $t_c$ offset and the maximum β offset based on a de-blocking_max_tu_offset_enabled_flag specified in one or both of the PPS and the header of the independently decodable unit.

55. The method of claim 50, wherein the one or more processors are further configured to, when applying the inverse quantization parameter, apply an inverse quantization parameter that varies based on a size of the inverse transform to de-quantize the block of encoded video data.

56. A video decoding device for decoding encoded video data comprising:
- means for applying an inverse quantization parameter to a block of the encoded video data to de-quantize the block of the encoded video data in a video bitstream;
- means for applying the inverse transform to the de-quantized block of the encoded video data to generate a block of residual video data;
- means for reconstructing a block of video data from the block of residual video data;
- means for determining a flag specified in a picture parameter set (PPS) of the encoded video data in the video bitstream that indicates whether at least one offset used in determining whether to perform de-blocking filtering of the reconstructed block of video data or used in determining de-blocking filtering strength is specified in one or both of the PPS and a header of an independently decodable unit that included the block of encoded video data;
- means for extracting, based on the flag the at least one offset from one or both of the PPS and the header of the independently decodable unit, wherein the at least one offset comprises one or more of a $t_c$ offset and a β offset, wherein the $t_c$ offset comprises an offset used for one or both of determining whether to perform de-blocking filtering or determining de-blocking filtering strength for both luma and chroma aspects of the reconstructed block of video data, and wherein the β offset comprises an offset used for one or both of determining whether to perform de-blocking filtering or determining de-blocking filtering strength for luma aspects of the reconstructed block of video data; and
- means for performing de-blocking filtering on the reconstructed block of video data based on the determined at least one offset.

57. The video decoding device of claim 56, wherein the flag comprises a de-blocking_filter_control_present_flag.

58. A non-transitory computer-readable medium having stored thereon instructions that, when executed, cause one or more processors to:
- apply an inverse quantization parameter to a block of the encoded video data to de-quantize the block of the encoded video data in a video bitstream;
- apply the inverse transform to the de-quantized block of the encoded video data to generate a block of residual video data;
- reconstruct a block of video data from the block of residual video data;
- determine a flag specified in a picture parameter set (PPS) of the encoded video data in the video bitstream that indicates whether at least one offset used in determining whether to perform de-blocking filtering of the reconstructed block of video data or used in determining de-blocking filtering strength is specified in one or both of the PPS and a header of an independently decodable unit that included the block of encoded video data;
- based on the flag, extract the at least one offset from one or both of the PPS and the header of the independently decodable unit, wherein the at least one offset comprises one or more of a $t_c$ offset and a β offset, wherein the $t_c$ offset comprises an offset used for one or both of determining whether to perform de-blocking filtering or determining de-blocking filtering strength for both luma and chroma aspects of the reconstructed block of video data, and wherein the β offset comprises an offset used for one or both of determining whether to perform de-blocking filtering or determining de-blocking filtering strength for luma aspects of the reconstructed block of video data; and
- perform de-blocking filtering on the reconstructed block of video data based on the determined at least one offset.

59. The non-transitory computer-readable medium of claim 58, wherein the flag comprises a de-blocking_filter_control_present _flag.

60. The non-transitory computer-readable medium of claim 58, wherein the at least one offset comprises at least one offset used for one or both of determining whether to perform the de-blocking filtering of the reconstructed block of video data or determining de-blocking filtering strength that is associated with whether the block of the encoded video data was intra-coded or inter-coded.

61. The non-transitory computer-readable medium of claim 58, wherein the instructions, when executed, further cause the one or more processors to, when determining the at least one offset, extract, from one or both of a picture parameter set (PPS) and a header of the independently decodable unit that includes the encoded version of the block of video data, a maximum $t_c$ offset and a maximum β offset that are used in place of the $t_c$ offset and the β offset that are otherwise used in determining whether to perform the de-blocking of the reconstructed block of the video data when a size of the transform applied to the block of video data is not a maximum transform unit size.

62. The non-transitory computer-readable medium of claim 61, wherein the instructions, when executed, further cause the one or more processors to, when extracting a maximum $t_c$ offset and a maximum β offset, extract the maximum $t_c$ offset and the maximum β offset based on a de-blocking_max_tu_offset_enabled_flag specified in one or both of the PPS and the header of the independently decodable unit.

63. The non-transitory computer-readable medium of claim 58, wherein the instructions, when executed, further cause the one or more processors to, when applying the inverse quantization parameter, apply an inverse quantization parameter that varies based on a size of the inverse transform to de-quantize the block of encoded video data.

\* \* \* \* \*